(12) United States Patent
Ohno et al.

(10) Patent No.: US 7,879,427 B2
(45) Date of Patent: *Feb. 1, 2011

(54) HONEYCOMB STRUCTURE

(75) Inventors: Kazushige Ohno, Gifu (JP); Masafumi Kunieda, Gifu (JP); Kazutake Ogyu, Gifu (JP)

(73) Assignee: Ibiden Co., Ltd, Gifu (JP)

( * ) Notice: Subject to any disclaimer, the term of this patent is extended or adjusted under 35 U.S.C. 154(b) by 351 days.

This patent is subject to a terminal disclaimer.

(21) Appl. No.: 11/320,974

(22) Filed: Dec. 30, 2005

(65) Prior Publication Data

US 2006/0292333 A1 Dec. 28, 2006

(30) Foreign Application Priority Data

Jun. 24, 2005 (WO) ............... PCT/JP2005/011657

(51) Int. Cl.
B32B 3/12 (2006.01)

(52) U.S. Cl. .................................................. 428/116

(58) Field of Classification Search ............... 428/116, 428/117, 119, 188, 913, 327; 501/118, 119, 501/120, 153, 154; 55/523, 529, 483, 502; 165/10

See application file for complete search history.

(56) References Cited

U.S. PATENT DOCUMENTS

| | | | | |
|---|---|---|---|---|
| 4,883,507 | A * | 11/1989 | Rey et al. | ............... 95/273 |
| 5,518,678 | A | 5/1996 | Miyamoto et al. | |
| 5,914,187 | A | 6/1999 | Naruse et al. | |
| 6,066,587 | A | 5/2000 | Kurokawa et al. | |
| 6,159,578 | A | 12/2000 | Ichikawa | |
| 6,596,666 | B1 | 7/2003 | Yamada | |
| 6,669,751 | B1 * | 12/2003 | Ohno et al. | ............... 55/523 |
| 6,764,743 | B2 | 7/2004 | Kato et al. | |
| 7,273,649 | B2 | 9/2007 | Miwa | |
| 7,316,722 | B2 | 1/2008 | Komori et al. | |
| 2003/0170160 | A1 * | 9/2003 | Morita et al. | ............... 423/247 |
| 2004/0055265 | A1 | 3/2004 | Ohno et al. | |

(Continued)

FOREIGN PATENT DOCUMENTS

DE 43 41 159 A1 6/1995

(Continued)

OTHER PUBLICATIONS

European Search Report.

(Continued)

Primary Examiner—Gordon R Baldwin
(74) Attorney, Agent, or Firm—Finnegan, Henderson, Farabow, Garrett & Dunner, LLP

(57) ABSTRACT

A honeycomb structure having multiple honeycomb units united through a seal material layer, wherein each honeycomb unit has multiple through holes arranged side by side in a longitudinal direction and separated from each other by the wall surfaces of the through holes, is disclosed. The honeycomb units include at least: ceramic particles; and at least one of inorganic fibers and whiskers. At least one of the honeycomb units has a cross section perpendicular to a longitudinal direction thereof, the cross section having an area greater than or equal to about 5 cm² and less than or equal to about 50 cm². Each corner of each honeycomb unit has a shape of one of a substantially rounded surface and a substantially chamfered surface.

14 Claims, 14 Drawing Sheets

U.S. PATENT DOCUMENTS

| | | |
|---|---|---|
| 2004/0097370 A1 | 5/2004 | Ichikawa et al. |
| 2004/0108056 A1 | 6/2004 | Fujita et al. |
| 2004/0128991 A1 | 7/2004 | Sakamoto |
| 2005/0025933 A1 | 2/2005 | Masukawa et al. |
| 2005/0109023 A1 | 5/2005 | Kudo et al. |
| 2005/0126140 A1 | 6/2005 | Ito et al. |
| 2005/0180898 A1 | 8/2005 | Yamada |
| 2005/0210848 A1* | 9/2005 | Kuki et al. .............. 55/523 |
| 2005/0227869 A1 | 10/2005 | Ohno et al. |
| 2005/0247038 A1* | 11/2005 | Takahashi .............. 55/523 |
| 2005/0266992 A1 | 12/2005 | Ohno et al. |
| 2006/0021310 A1 | 2/2006 | Ohno et al. |
| 2006/0150597 A1 | 7/2006 | Masukawa et al. |
| 2006/0172113 A1 | 8/2006 | Kunieda |
| 2006/0177629 A1 | 8/2006 | Kunieda |
| 2006/0292044 A1 | 12/2006 | Ohno et al. |
| 2006/0292330 A1 | 12/2006 | Ohno et al. |
| 2006/0292331 A1 | 12/2006 | Ohno et al. |
| 2006/0292332 A1 | 12/2006 | Ohno et al. |
| 2006/0292334 A1 | 12/2006 | Ohno et al. |
| 2006/0292335 A1 | 12/2006 | Ohno et al. |
| 2006/0292336 A1 | 12/2006 | Ohno et al. |
| 2006/0292337 A1 | 12/2006 | Ohno et al. |
| 2006/0292338 A1 | 12/2006 | Ohno et al. |
| 2006/0292339 A1 | 12/2006 | Ohno et al. |
| 2006/0292340 A1 | 12/2006 | Ohno et al. |
| 2006/0292341 A1 | 12/2006 | Ohno et al. |
| 2006/0292342 A1 | 12/2006 | Ohno et al. |
| 2007/0004592 A1 | 1/2007 | Ohno et al. |
| 2007/0004593 A1 | 1/2007 | Ohno et al. |
| 2007/0077190 A1 | 4/2007 | Ohno et al. |
| 2008/0118701 A1 | 5/2008 | Ohno et al. |
| 2008/0119355 A1 | 5/2008 | Ohno et al. |
| 2008/0176028 A1 | 7/2008 | Ohno et al. |
| 2008/0187713 A1 | 8/2008 | Ohno et al. |
| 2008/0241003 A1 | 10/2008 | Ido et al. |
| 2008/0241005 A1 | 10/2008 | Ido et al. |
| 2008/0241008 A1 | 10/2008 | Ido et al. |
| 2008/0260991 A1 | 10/2008 | Konstandopoulos et al. |

FOREIGN PATENT DOCUMENTS

| | | |
|---|---|---|
| EP | 0 278 749 A1 | 8/1988 |
| EP | 1 101 910 A2 | 5/2001 |
| EP | 1 142 619 A1 | 10/2001 |
| EP | 1 247 556 A1 | 10/2002 |
| EP | 1 338 326 A1 | 8/2003 |
| EP | 1 384 508 A1 | 1/2004 |
| EP | 1 447 535 A1 | 8/2004 |
| EP | 1 452 511 A1 | 9/2004 |
| EP | 1 479 881 A1 | 11/2004 |
| EP | 1 479 882 A1 | 11/2004 |
| EP | 1 538 133 A1 | 6/2005 |
| EP | 1 612 197 A1 | 1/2006 |
| EP | 1 674 147 A1 | 6/2006 |
| EP | 1 707 545 A1 | 10/2006 |
| JP | 04-042184 * | 8/1993 |
| JP | 05-213681 | 8/1993 |
| JP | 08-012460 A | 1/1996 |
| JP | 10-263416 | 10/1998 |
| JP | 2000-102709 | 4/2000 |
| JP | 2000-279729 A | 10/2000 |
| JP | 2001-096116 A | 4/2001 |
| JP | 2001-96117 | 4/2001 |
| JP | 2001-097777 A | 4/2001 |
| JP | 2001-138416 A | 5/2001 |
| JP | 2001-162119 A | 6/2001 |
| JP | 2001-162121 | 6/2001 |
| JP | 2001-190916 A | 7/2001 |
| JP | 2001-329836 A | 11/2001 |
| JP | 2002-102627 A | 4/2002 |
| JP | EP1249262 * | 10/2002 |
| JP | 2002-326034 A | 11/2002 |
| JP | 2003-155908 A | 5/2003 |
| JP | 2004-051384 A | 2/2004 |
| KR | 2004-0099338 A | 11/2004 |
| WO | WO 03/067041 A1 | 8/2003 |
| WO | WO 03/091182 | 11/2003 |
| WO | WO 2004/083149 A1 | 9/2004 |
| WO | PCT/JP2005/021193 | 11/2005 |
| WO | WO 2006/025283 A1 | 3/2006 |
| WO | WO 2006/070540 A1 | 7/2006 |

OTHER PUBLICATIONS

Co-pending U.S. Appl. No. 12/194,888.
Co-pending U.S. Appl. No. 12/238,057.
Co-pending U.S. Appl. No. 12/245,821.
Co-pending U.S. Appl. No. 12/246,899.
Co-pending U.S. Appl. No. 12/246,881.
Co-pending U.S. Appl. No. 12/239,342.
Co-pending U.S. Appl. No. 12/246,913.
Co-pending U.S. Appl. No. 12/246,869.
Co-pending U.S. Appl. No. 12/248,647.
Co-pending U.S. Appl. No. 12/248,675.
Co-pending U.S. Appl. No. 12/379,768, filed Feb. 27, 2009.
Co-pending U.S. Appl. No. 12/516,813, filed May 29, 2009.
U.S. Appl. No. 11/925,394, filed Jun. 8, 2007, entitled Honeycomb Structured Body, Method for Manufacturing Honeycomb Structured Body and Honeycomb Structured Body Manufacturing Apparatus.
U.S. Appl. No. 11/853,658, filed Sep. 11, 2007, entitled Catalyst Carrier.
U.S. Appl. No. 11/928,546, filed Oct. 30, 2007, entitled Mixed Particles and Honeycomb Structure for Gas Conversion Apparatus.
Co-pending U.S. Appl. No. 12/407,645, filed Mar. 19, 2009, to Kazushige Ohno et al., entitled "Honeycomb Structure and Method for Manufacturing Honeycomb Structure".
Co-pending U.S. Appl. No. 12/248,625, filed Oct. 9, 2008, to Masafumi Kunieda et al., entitled "Honeycomb Structural Body".
Co-pending U.S. Appl. No. 12/271,216, filed Nov. 14, 2008, to Kazushige Ohno et al., entitled "Honeycomb Structure and Exhaust Gas Treating Apparatus".
Co-pending U.S. Appl. No. 12/368,514, filed Feb. 10, 2009, to Masafumi Kunieda et al., entitled "Honeycomb Structure".
Co-pending U.S. Appl. No. 12/346,628, filed Dec. 30, 2008, to Kazushige Ohno et al., entitled "Honeycomb Structure".
Co-pending U.S. Appl. No. 12/346,610, filed Dec. 30, 2008, to Masafumi Kunieda et al., entitled "Honeycomb Structure".
Co-pending U.S. Appl. No. 12/367,780, filed Feb. 9, 2009, to Kazushige Ohno et al., entitled "Honeycomb Structure".
Co-pending U.S. Appl. No. 12/389,338, filed Feb. 19, 2009, to Kazushige Ohno et al., entitled "Honeycomb Structure".
Co-pending U.S. Appl. No. 12/358,937, filed Jan. 23, 2009, to Kazushige Ohno et al., entitled "Honeycomb Structure".
Co-pending U.S. Appl. No. 12/389,343, filed Feb. 19, 2009, to Kazushige Ohno et al., entitled "Honeycomb Structure and Process for Manufacturing Honeycomb Structure".
Co-pending U.S. Appl. No. 12/359,957, filed Jan. 26, 2009, to Kazushige Ohno et al., entitled "Honeycomb Structure".
Co-pending U.S. Appl. No. 12/343,965, filed Dec. 24, 2008, to Kazushige Ohno et al., entitled "Honeycomb Structure and Manufacturing Method of the Honeycomb Structure".
Co-pending U.S. Appl. No. 12/359,969, filed Jan. 26, 2009, to Kazushige Ohno et al., entitled "Honeycomb Structure".
Co-pending U.S. Appl. No. 12/369,347, filed Feb. 11, 2009, to Kazushige Ohno et al., entitled "Honeycomb Structure".
Co-pending U.S. Appl. No. 12/372,192, filed Feb. 17, 2009, to Kazushige Ohno et al., entitled "Honeycomb Structure".
Co-pending U.S. Appl. No. 12/372,229, filed Feb. 17, 2009, to Kazushige Ohno et al., entitled "Honeycomb Structure".
Co-pending U.S. Appl. No. 12/368,551, filed Feb. 10, 2009, to Kazushige Ohno et al., entitled "Honeycomb Structure".

Co-pending U.S. Appl. No. 12/362,310, filed Jan. 29, 2009, to Kazushige Ohno et al., entitled "Honeycomb Structure, Exhaust Gas Cleaning Unit, and Manufacturing Method of Honeycomb Structure".

Co-pending U.S. Appl. No. 12/355,999, filed Jan. 19, 2009, to Kazushige Ohno et al., entitled "Honeycomb Structure".

Co-pending U.S. Appl. No. 12/355,990, filed Jan. 19, 2009, to Kazushige Ohno et al., entitled "Honeycomb Structure".

Derwent abstract of XP-002375248.

* cited by examiner

BEST AVAILABLE COPY

HONEYCOMB STRUCTURE

BACKGROUND OF THE INVENTION

1. Field of the Invention

The present invention relates to a honeycomb structure.

2. Description of the Related Art

Conventionally, a common honeycomb catalyst used for conversion of automotive exhaust gas is manufactured by having a high specific surface area material such as activated alumina and catalyst metal such as platinum carried on the surface of a monolithic cordierite-based honeycomb structure having a low thermal expansion characteristic. Further, alkaline earth metal such as Ba is carried as a $NO_x$ occlusion agent for processing $NO_x$ in an oxygen-excess atmosphere such as a lean-burn engine or a diesel engine. In order to achieve a further improvement in conversion performance, it is necessary to increase the probability of contact of exhaust gas and the catalyst noble metal and the $NO_x$ occlusion agent. This requires the carrier to have a higher specific surface area and the particles of the noble metal to be reduced in size and highly dispersed. However, a mere increase in the carried amount of a high specific surface area material such as activated alumina only results in an increase in the thickness of the alumina layer, thus causing a problem in that the probability of contact is not increased or that pressure loss is too high. Accordingly, some modifications have been made on cell shape, cell density, and wall thickness (for example, see JP-A 10-263416). On the other hand, as a honeycomb structure formed of a high specific surface area material, a honeycomb structure formed by extrusion molding using a composition including inorganic fibers and an inorganic binder is known (for example, see JP-A 5-213681). Further, a honeycomb structure formed by joining honeycomb units through an adhesion layer in order to increase the size of such a honeycomb structure is known (for example, see DE 4341159 A1).

The contents of JP-A 10-263416, JP-A 5-213681, and DE 4341159 A1 are incorporated herein by reference in their entirety.

SUMMARY OF THE INVENTION

According to one aspect of the present invention, provided is a honeycomb structure having a plurality of honeycomb units united through a seal material layer, the honeycomb units each having a plurality of through holes arranged side by side in a longitudinal direction and separated from each other by wall surfaces of the through holes, wherein the honeycomb units include at least ceramic particles and at least one of inorganic fibers and whiskers, at least one of the honeycomb units has a cross section perpendicular to a longitudinal direction thereof, the cross section having an area greater than or equal to about 5 cm$^2$ and less than or equal to about 50 cm$^2$; and each of corners of each honeycomb unit has a shape of one of a substantially rounded surface and a substantially chamfered surface.

Thus, according to one embodiment of the present invention, a honeycomb structure capable of achieving high dispersion of a catalyst component and increasing strength against thermal shock and vibration may be provided.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Next, a description is given, with reference to the accompanying drawings, of an embodiment of the present invention.

Figure 1A:
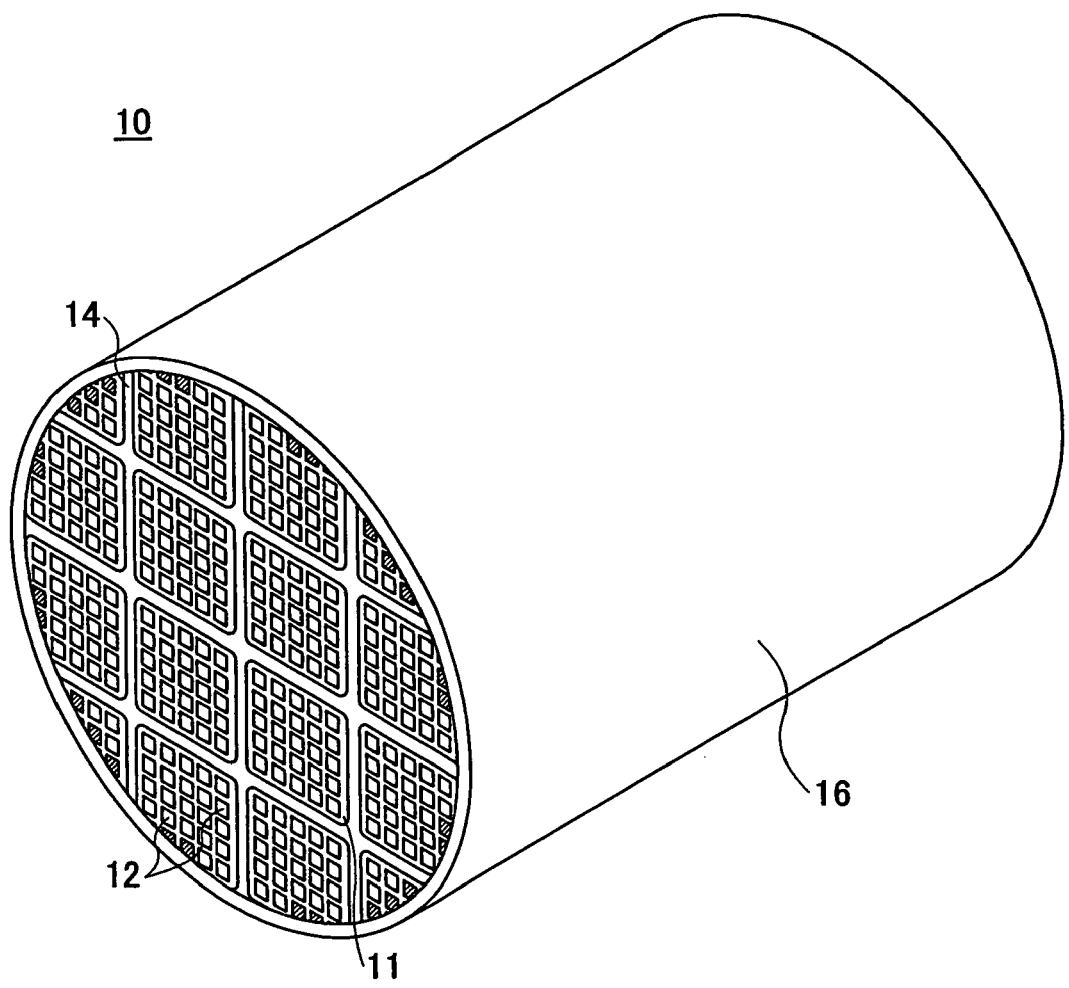
FIG. 1A is a conceptual diagram showing a honeycomb structure according to an embodiment of the present invention.
Figure 2A:
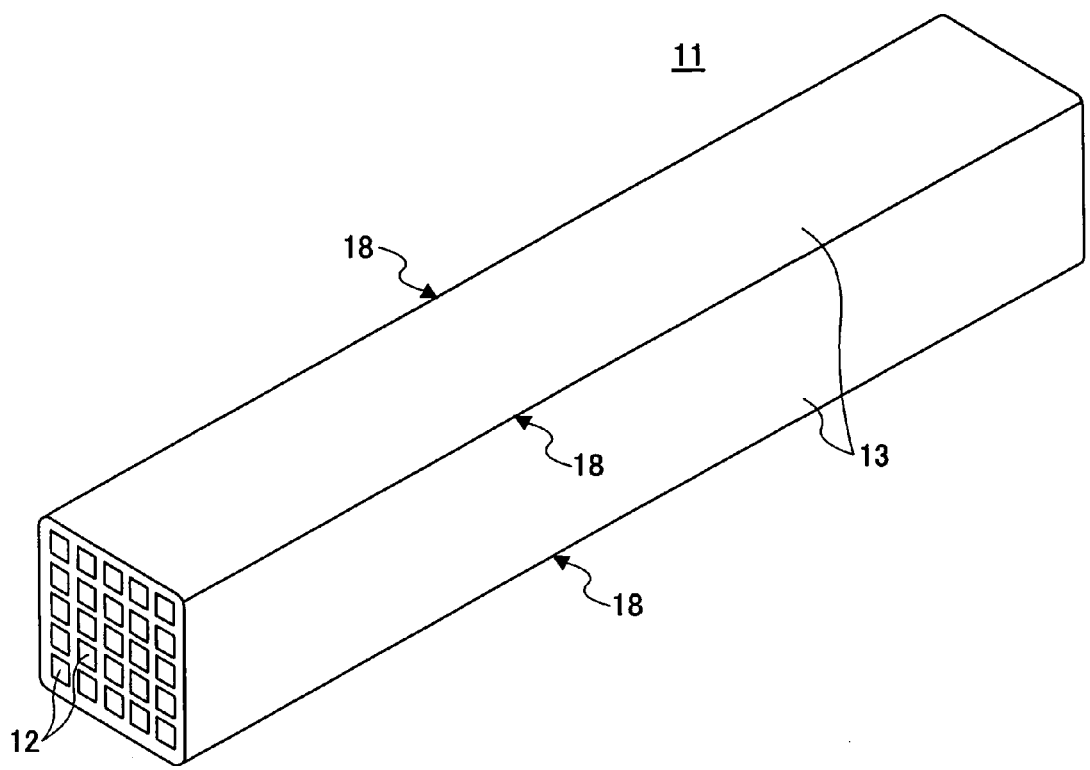
FIG. 2A is a conceptual diagram showing the honeycomb unit according to the embodiment of the present invention.

FIG. 1A is a conceptual diagram of a honeycomb structure 10 according to the embodiment of the present invention. Referring to FIG. 1A, the honeycomb structure 10 according to this embodiment is formed by uniting multiple honeycomb units 11 through a seal material layer 14. Each honeycomb unit 11 has multiple through holes 12 arranged side by side in a longitudinal direction, being separated by through hole wall surfaces. Each honeycomb unit 11 includes at least ceramic particles and inorganic fibers and/or whiskers. The area of a cross section of the honeycomb unit 11 perpendicular to a longitudinal direction thereof is greater than or equal to about 5 cm² and less than or equal to about 50 m². Corners 18 (FIGS. 2A through 2C) of the honeycomb unit 11 have substantially rounded-surface and/or substantially chamfered-surface shapes.

This honeycomb structure 10 has the multiple honeycomb units 11 joined through the seal material layer 14. Accordingly, it is possible to increase strength against thermal shock and vibration. It is inferred that this is because it is possible to reduce a difference in temperature in each honeycomb unit 11 even when there is a distribution of temperature in the honeycomb structure 10 because of a sudden change in temperature, or because it is possible to ease thermal shock and vibration with the seal material layer 14. Further, it is believed that also in the case of formation of cracks in one or more of the honeycomb units 11 due to thermal stress, the seal material layer 14 prevents the cracks from extending to the entire honeycomb structure 10 and serves as the frame of the honeycomb structure 10 to maintain the shape as a honeycomb structure, thereby preventing the honeycomb structure 10 from losing the ability to function as a catalyst carrier. With respect to the size of each honeycomb unit 11, if the area of a cross section of the honeycomb unit 11 perpendicular to its through holes 12 (hereinafter, simply referred to as "cross-sectional area") is greater than or equal to about 5 cm², the cross-sectional area of the seal material layer 14 joining the multiple honeycomb units 11 decreases so as to be able to relatively increase the specific surface area carrying a catalyst and relatively reduce pressure loss. On the other hand, if the cross-sectional area of the honeycomb unit 11 is less than or equal to about 50 cm², the honeycomb unit 11 is not too large in size, and accordingly, can sufficiently control thermal stress generated therein. That is, with a cross-sectional area of about 5 cm² to about 50 cm², each honeycomb unit 11 is at a practicable level, having reduced pressure loss, sufficient strength against thermal stress, and high durability while maintaining a large specific surface area. Therefore, according to this honeycomb structure 10, it is possible to cause a catalyst component to be highly dispersed, and to increase strength against thermal shock and vibration. If the honeycomb structure 10 includes multiple types of honeycomb units having different cross-sectional areas, the term "cross-sectional area" refers to the cross-sectional area of a honeycomb unit that is a basic unit of the honeycomb structure 10, and usually refers to the largest one of the cross-sectional areas of the honeycomb units.

Further, it is preferable that the radius of curvature R (indicated by a in FIG. 2B) of the rounded-surfaces of the corners 18 of each honeycomb unit 11 be about 0.3 mm to about 2.5 mm (0.3 mm≦a≦2.5 mm).

In the honeycomb structure 10 of this embodiment, since the corners 18 of each honeycomb unit 11 on its exterior surface have substantially rounded-surface and/or substantially chamfered-surface shapes, it is possible to avoid concentration of stress on the corners 18. Accordingly, it is possible to prevent chipping from being caused in the honeycomb unit 11 and to prevent cracks from being caused and spreading in the seal material layer 14 from the corners 18 as starting points. Preferably, the radius of curvature R of the rounded-surface shapes is about 0.3 mm to about 2.5 mm. If the radius of curvature R is greater than or equal to about 0.3 mm, concentration of stress on the corners 18 can be avoided sufficiently, so that chipping and cracks are less likely to be caused. If the radius of curvature R is less than or equal to about 2.5 mm, the cross-sectional area of the honeycomb unit 11 increases, so that the processing capability of the honeycomb structure 10 is less likely to be reduced.

Further, it is preferable that the chamfered-surface shapes be about 0.3 mm to about 2.5 mm in size (indicated by b in FIG. 2C, 0.3 mm≦b≦2.5 mm) because this eases concentration of stress on the edge parts of the honeycomb structure 10, thus increasing its strength. If the chamfered-surface shapes are greater than or equal to about 0.3 mm, concentration of stress on the corners 18 can be avoided sufficiently, so that chipping and cracks are less likely to be caused. Further, if the chamfered-surface shapes are less than or equal to about 2.5 mm, the difference in thickness of the seal material does not increase, so that the honeycomb structure 10 is less likely to be broken because of thermal stress. Further, the cross-sectional area of the honeycomb unit 11 increases, so that the processing capability of the honeycomb structure 10 is less likely to be reduced.

Figure 2B:
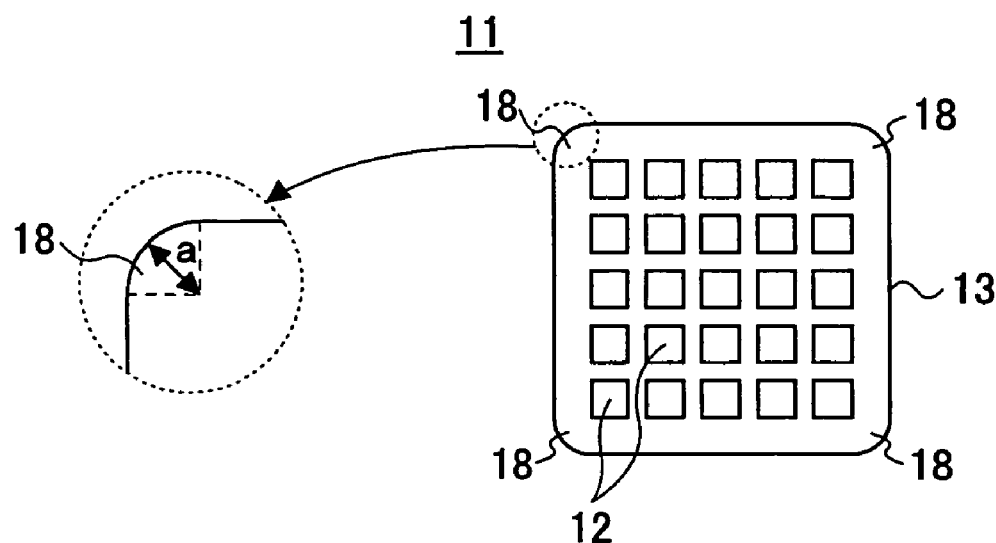
FIGS. 2B through 2E are diagrams for illustrating the shapes of the corners of the honeycomb units according to the embodiment of the present invention.
Figure 2C:
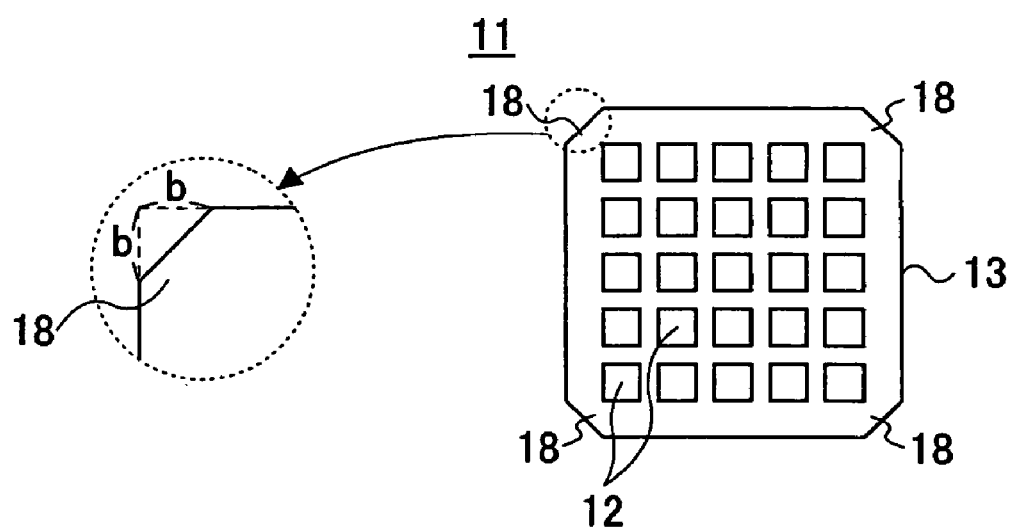
Figure 2D:
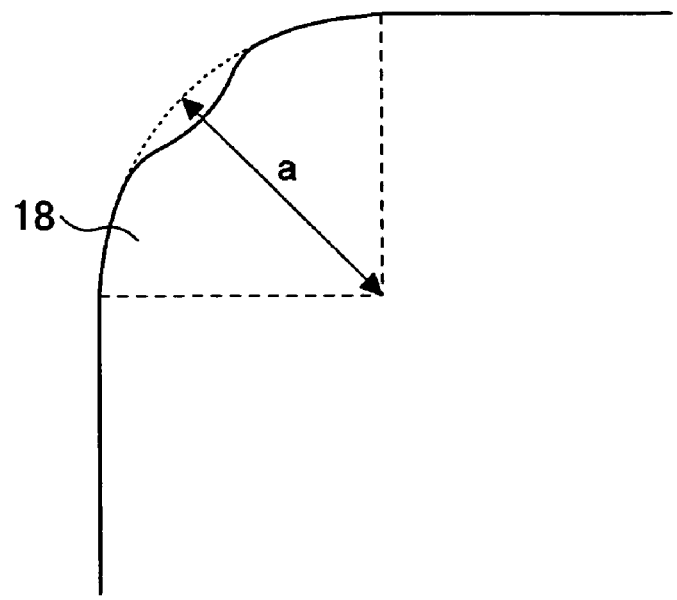
Figure 2E:
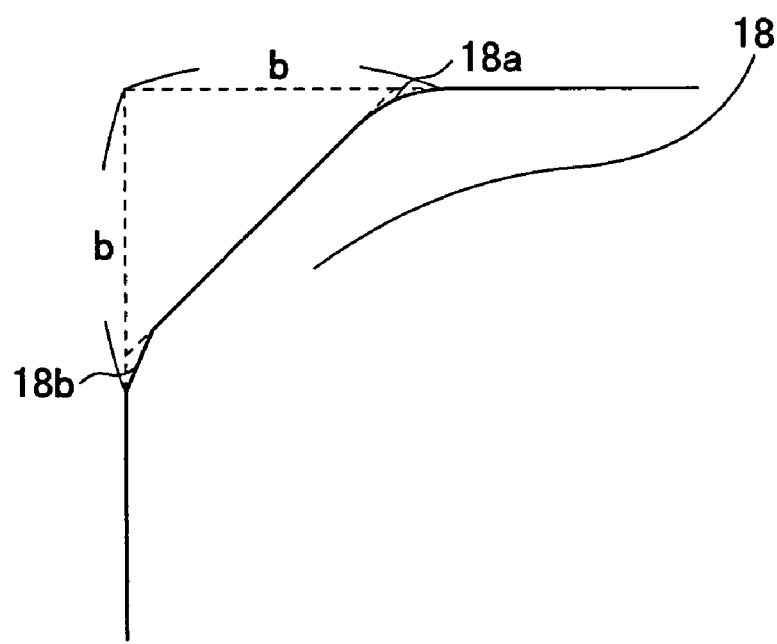

As described above, the corners 18 of the honeycomb unit 11 have substantially rounded-surface and/or substantially chamfered-surface shapes. Here, by the term "substantially," it is intended that the surface shape of each corner 18 may not be precisely rounded or chamfered, and that the rounded-surface or chamfered-surface shape of each corner 18 may include a shape similar thereto as long as the shape produces the same effect as described above (avoiding concentration of stress on the corners 18). For example, as shown in FIG. 2D, the rounded-surface shape of the corner 18 may include unevenness. Further, as shown in FIG. 2E, the chamfered-surface shape of the corner 18 may further include a rounded surface 18a and a chamfered surface 18b as long as this shape produces the same effect as described above. In this case, the rounded surface 18a may be replaced by a chamfered surface, and the chamfered surface 18b may be replaced by a rounded surface. Further, in FIG. 2C, the triangle formed by the chamfered surface of the corner 18 (hypotenuse) and the two sides indicated by b (broken lines) may be any right triangle as long as the length of each side indicated by b falls within the above-described range of about 0.3 mm to about 2.5 mm.

The ratio of the total of the cross-sectional areas of the honeycomb units 11 (the areas of cross sections of the honeycomb units 11 perpendicular to a longitudinal direction thereof) to the cross-sectional area of the honeycomb structure 10 (the area of a cross section of the honeycomb structure 10 perpendicular to a longitudinal direction thereof) is preferably greater than or equal to about 85%, and more preferably, greater than or equal to about 90%. If this ratio is greater than or equal to about 85%, the cross-sectional area of the seal material layer 14 decreases so as to increase the total cross-sectional area of the honeycomb units 11. Therefore, it is possible to relatively increase the specific surface area carrying a catalyst, and to relatively reduce pressure loss. When this ratio is greater than or equal to about 90%, it is possible to further reduce pressure loss.

The honeycomb structure 10 according to this embodiment may include a coating material layer 16 (FIG. 1A) coating an exterior axial surface 15 (exterior cylindrical surface in the case of FIG. 1B) of the joint body of the honeycomb units 11, or the exterior surface of the joint body of the honeycomb units 11 which surface is along the axial directions of the joint body. This protects the exterior cylindrical surface of the honeycomb structure 10, so that its strength can be increased.

The honeycomb structure 10 into which the honeycomb units 11 are joined is not limited in shape in particular, and may also be shaped like, for example, a prism.

In the honeycomb structure 10 of this embodiment, the aspect ratio of inorganic fibers and/or whiskers included in each honeycomb unit 11 is preferably about 2 to about 1000, more preferably, about 5 to about 800, and most preferably, about 10 to about 500. If the aspect ratio of inorganic fibers and/or whiskers is greater than or equal to about 2, it is possible to increase their contribution to an increase in the strength of the honeycomb structure. On the other hand, aspect ratios less than or equal to about 1000 are less likely to cause clogging of a die for extrusion molding at the time of molding, thus resulting in good moldability. Further, at the time of molding such as extrusion molding, the inorganic fibers and/or whiskers are less likely to break, and accordingly, are less likely to vary in length, thus increasing their contribution to an increase in the strength of the honeycomb structure 10. If the inorganic fibers and/or whiskers have their aspect ratios distributed, the aspect ratio of inorganic fibers and/or whiskers may be their average.

In the honeycomb structure 10 of this embodiment, the ceramic particles included in each honeycomb unit 11 are not limited in particular. The ceramic particles include one or more selected from, for example, silicon carbide, silicon nitride, alumina, silica, zirconia, titania, ceria, mullite, and zeolite. Of these, alumina is preferred.

In the honeycomb structure 10 of this embodiment, the inorganic fibers and/or whiskers included in each honeycomb unit 11 are not limited in particular. The inorganic fibers and/or whiskers include one or more selected from alumina, silica, silicon carbide, silica alumina, aluminum borate, glass, and potassium titanate.

The ceramic particles included in the honeycomb structure 10 are preferably about 30 wt % to about 97 wt %, more preferably about 30 wt % to about 90 wt %, still more preferably about 40 wt % to about 80 wt %, and most preferably about 50 wt % to about 75 wt % in amount. If the ceramic particles content is greater than or equal to about 30 wt %, the ceramic particles contributing to an increase in the specific surface area relatively increase in amount. This increases the specific surface area as a honeycomb structure so as to make it possible to carry a catalyst component with high dispersion easily. If the ceramic particles content is less than or equal to about 90 wt %, the inorganic fibers and/or whiskers contributing to an increase in strength relatively increase in amount, so that the strength of the honeycomb structure 10 is less likely to be reduced.

The inorganic fibers and/or whiskers included in the honeycomb units 11 of the honeycomb structure 10 are preferably about 3 wt % to about 70 wt %, more preferably about 3 wt % to about 50 wt %, still more preferably about 5 wt % to about 40%, and most preferably about 8 wt % to about 30 wt % in amount. If the inorganic fibers and/or whiskers content is greater than or equal to about 3 wt %, the strength of the honeycomb structure 10 is less likely to be reduced. If the inorganic fibers and/or whiskers content is less than or equal to about 50 wt %, the ceramic particles contributing to an increase in the specific surface area relatively increase in amount. This increases the specific surface area as a honeycomb structure so as to make it possible to carry a catalyst component with high dispersion easily.

In the honeycomb structure 10 of this embodiment, each honeycomb unit 11 may also be manufactured with further inclusion of an inorganic binder. This makes it possible to obtain sufficient strength even when firing is performed on the honeycomb unit 11 at lower temperatures. The inorganic binder included in the honeycomb structure 10 is not limited in particular. The inorganic binder may be, for example, inorganic sol, a clay-based binder, etc. Of these, the inorganic sol includes one or more selected from, for example, alumina sol, silica sol, titania sol, and water glass. The clay-based binder includes one or more clay-based binders selected from, for example, clay, kaolin, montmonrillonite, and clays of a double-chain structure type (sepiolite and attapulgite). The inorganic binder included at the time of manufacturing the honeycomb units 11 is preferably less than or equal to about 50 wt %, more preferably about 5 wt % to about 50 wt %, still more preferably about 10 wt % to about 40 wt %, and most preferably about 15 wt % to about 35 wt % in amount as a solid content included in the honeycomb structure 10. If the inorganic binder content is less than or equal to about 50 wt % in amount, moldability is prevented from being degraded.

The shape of each honeycomb unit 11 is not limited in particular. Preferably, the honeycomb units 11 are shaped so as to facilitate joining of the honeycomb units 11. A section of the honeycomb unit 11 perpendicular to the through holes 12 (hereinafter, simply referred to as "cross section") may be square or rectangular. FIG. 2 is a conceptual diagram of an example of the honeycomb units 11, which is a parallelepiped one having a square cross section. Referring to FIG. 2, the honeycomb unit 11 includes the multiple through holes 12 extending from the front side to the rear side, and an exterior surface 13 having no openings of the through holes 12. The thickness of the wall between the through holes 12 is not limited in particular. The wall thickness is preferably about 0.05 mm to about 0.35 mm, more preferably about 0.10 mm to about 0.30 mm, and most preferably about 0.15 mm to about 0.25 mm. If the wall thickness is greater than or equal to about 0.05 mm, the strength of the honeycomb unit 11 is less likely to be reduced. On the other hand, if the wall thickness is less than or equal to about 0.35 mm, the area of contact with exhaust gas increases, so that the exhaust gas is likely to penetrate sufficiently deeply. As a result, a catalyst carried on the inside of the wall is likely to come into contact with the exhaust gas, so that it is possible to improve catalyst performance. Further, the number of through holes 12 per unit cross-sectional area is preferably about $15.5/cm^2$ to about $186/cm^2$ (about 100 cpsi to about 1200 cpsi), more preferably about $46.5/cm^2$ to about $170.5/cm^2$ (about 300 cpsi to about 1100 cpsi), and most preferably about $62.0/cm^2$ to about $155/cm^2$ (about 400 cpsi to about 1000 cpsi). If the number of through holes 12 is greater than or equal to about $15.5/cm^2$, the area of the wall inside the honeycomb unit 11 which wall contacts exhaust gas increases. If the number of through holes 12 is less than or equal to about $186/cm^2$, pressure loss is less likely to increase, and it is easy to manufacture the honeycomb unit 11.

Each honeycomb unit 11 forming the honeycomb structure 10 may be of such size as to have a cross-sectional area of preferably about 5 $cm^2$ to about 50 cm, more preferably about 6 $cm^2$ to about 40 $cm^2$, and most preferably about 8 $cm^2$ to about 30 $cm^2$. If the cross-sectional area falls within the range of about 5 $cm^2$ to about 50 $cm^2$, it is possible to control the ratio of the seal material layer 14 to the honeycomb structure 10. This makes it possible to keep high the specific surface area per unit volume of the honeycomb structure 10, and accordingly, to have a catalyst component highly dispersed. This also makes it possible to maintain the shape as a honeycomb structure even if an external force such as thermal shock or vibration is applied. The specific surface area per unit volume can be given by Eq. (1) described below.

An object of the present invention may be to provide a honeycomb structure capable of achieving high dispersion of a catalyst component and increasing strength against thermal shock and vibration.

According to one embodiment of the present invention, a carrier can have a higher specific surface area, and the particles of a catalyst metal can be reduced in size and can be more highly dispersed. That is, it is possible to increase the specific surface area of a high specific surface area material such as alumina at its initial stage. Accordingly, even if sintering of a high specific surface area material progresses because of thermal aging (use as a catalyst carrier), and with this, a catalyst metal such as platinum carried thereon coheres so as to increase in particle size, it is possible to maintain a high specific surface area. As a result, it is possible to increase the probability of contact of exhaust gas with a catalyst noble metal and a $NO_x$ occlusion agent and thus to achieve a further improvement in conversion performance without carrying a large amount of noble metal such as platinum, which is very expensive and a limited valuable resource, as catalyst metal or increasing the size of a catalyst carrier itself. Further, since a catalyst carrier itself is not increased in size, it is suitable for installation in automobiles, which are limited in space for installation. Further, since it is possible to increase the specific surface area of the carrier without reducing the thickness of its partition walls, sufficient strength can be obtained. Further, a honeycomb structure has multiple honeycomb units joined through a seal material layer. This makes it possible to reduce a difference in temperature in each honeycomb unit even when there is a distribution of temperature in the honeycomb structure because of a sudden change in temperature. This also makes it possible to ease thermal shock and vibration with the seal material layer. Further, in the case of formation of cracks in one or more of the honeycomb units due to thermal stress, the seal material layer prevents the cracks from extending to the entire honeycomb structure and serves as the frame of the honeycomb structure to maintain the shape as a honeycomb structure. Accordingly, even if thermal stress due to a sudden change in temperature or external force such as great vibration is applied in the case of, for example, use for automobiles, the honeycomb structure is prevented from breaking easily, and can maintain the shape as a honeycomb structure and accordingly, function as a catalyst carrier. Further, in the honeycomb structure, since the corners of each honeycomb unit on its exterior surface have substantially rounded-surface and/or substantially chamfered-surface shapes, it is possible to avoid concentration of stress on the corners. Accordingly, it is possible to prevent chipping from being caused in the honeycomb unit and to prevent cracks from being caused and spreading in the seal material layer from the corners as starting points. Therefore, breakage of the honeycomb structure, as well as a decrease in processing efficiency due to exhaust gas leakage, can be prevented.

Next, a description is given of a method of manufacturing the above-described honeycomb structure 10 of this embodiment. First, honeycomb unit molded bodies are made by extrusion molding using raw material paste including the above-described ceramic particles, inorganic fibers and/or whiskers, and inorganic binder as principal components. In addition to these; an organic binder, a dispersion medium, and a molding aid may be added appropriately to the raw material paste in accordance with moldability. The organic binder is not limited in particular. The organic binder includes one or more selected from, for instance, methylcellulose, carboxymethylcellulose, hydroxyethylcellulose, polyethylene glycol, phenolic resin, and epoxy resin. The mix proportion of the organic binder is preferably about 1 part to about 10 parts by weight to the total of 100 parts by weight of the ceramic particles, the inorganic fibers and/or whiskers, and the inorganic binder. The dispersion medium is not limited in particular, and may be, for example, water, an organic solvent (such as benzene), alcohol (such as methanol), etc. The molding aid is not limited in particular, and may be, for example, ethylene glycol, dextrin, a fatty acid, fatty acid soap, and polyalcohol.

The raw material paste is not limited in particular. It is preferable to mix and knead the raw material paste. For example, the raw material paste may be mixed using a mixer or attritor, and may be well kneaded with a kneader. The method of molding the raw material paste is not limited in particular. Preferably, the raw material paste is formed into a shape having through holes by, for example, extrusion molding or the like.

The corners 18 of the honeycomb units 11 may be provided with substantially rounded-surface and/or substantially chamfered-surface shapes by providing the exterior surface of a mold used for the extrusion molding with a substantially rounded-surface and/or substantially chamfered-surface shape.

The corners 18 of the honeycomb units 11 may be formed into rounded-surface shapes of a radius of curvature R and/or chamfered-surface shapes of a predetermined size by chamfering such as grinding or cutting. FIG. 2B is a front view of the honeycomb unit 11 in which the corners 18 are provided with rounded-surface shapes. FIG. 2C is a front view of the honeycomb unit 11 in which the corners 18 are provided with chamfered-surface shapes. The stage of chamfering is not limited to this time point, and chamfering may be performed, for example, after firing. In this case, it is desirable to provide the unit corners with a large film thickness in advance so as to prevent the unit corners 18 from becoming thin.

Next, it is preferable to dry the obtained molded bodies. The drier used for drying is not limited in particular, and may be a microwave drier, hot air drier, dielectric drier, reduced-pressure drier, vacuum drier, and freeze drier. Further, it is preferable to degrease the obtained molded bodies. The conditions for degreasing are not limited in particular, and are selected suitably in accordance with the organic matter included in the molded bodies. Preferably, the conditions are a heating temperature of approximately 400° C. and a heating time of approximately 2 hours.

Further, it is preferable to subject the obtained molded bodies to firing. The condition for firing is not limited in particular, and is preferably at about 600° C. to about 1200° C., and more preferably at about 600° C. to about 1000° C. This is because sintering of the ceramic particles progresses sufficiently at firing temperatures higher than or equal to about 600° C., thus preventing strength as a honeycomb structure from being reduced, and because sintering of the ceramic particles does not progress excessively at firing temperatures lower than or equal to about 1200° C., thus increasing the specific surface area per unit volume, so that a carried catalyst component can be dispersed highly enough with ease. By way of these processes, the honeycomb units 11 each having the multiple through holes 12 can be obtained.

Next, the paste of a seal material to serve as the seal material layer 14 is applied on the obtained honeycomb units 11, and the honeycomb units 11 are successively joined. Thereafter, the honeycomb units 11 may be dried and solidified so as to be formed into a honeycomb unit joint body of a predetermined size. The seal material is not limited in particular. For example, a mixture of an inorganic binder and ceramic particles, a mixture of an inorganic binder and inorganic fibers, and a mixture of an inorganic binder, ceramic particles, and inorganic fibers may be used as the seal material. An organic binder may be added to these seal materials. The organic binder is not limited in particular, and includes one or more selected from, for example, polyvinyl alcohol, methylcellulose, ethylcellulose, and carboxymethylcellulose.

Figure 1B:
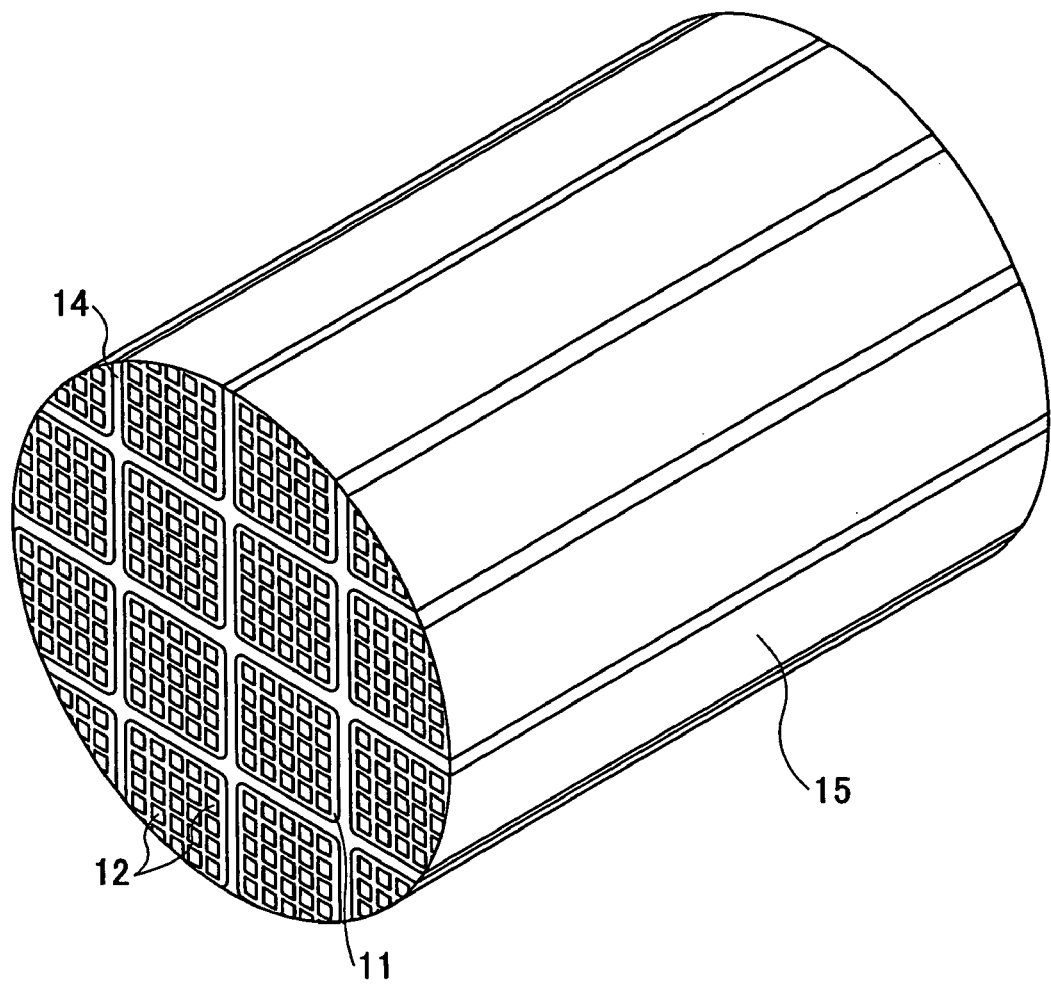
FIG. 1B is a diagram showing a joint body of honeycomb units according to the embodiment of the present invention.

The seal material layer 14 joining the honeycomb units 11 is preferably about 0.5 mm to about 2 mm in thickness. If the seal material layer 14 is greater than or equal to about 0.5 mm in thickness, sufficient joining strength is likely to be obtained. Further, the seal material layer 14 is a part that does not function as a catalyst carrier. Accordingly, if the seal material layer 14 is less than or equal to about 2 mm in thickness, the specific surface area per unit volume of the honeycomb structure 10 is less likely to be reduced, so that a catalyst component can be carried with sufficiently high dispersion with ease. Further, if the seal material layer 14 is less than or equal to about 2 mm in thickness, pressure loss is less likely to be increased. The number of honeycomb units 11 to be joined may be determined suitably in accordance with the size of the honeycomb structure 10 to be used as a honeycomb catalyst. Further, the joint body into which the honeycomb units 11 are joined with the seal material may also be cut and ground suitably in accordance with the shape and size of the honeycomb structure 10, for example, as shown in FIG. 1B. FIG. 1B is a perspective view of the joint body of the honeycomb units 11 after cutting and grinding.

The coating material layer 16 may be formed by applying a coating material on the exterior cylindrical surface (side surface) 15 of the joint body of the honeycomb units 11, and drying and solidifying the coating material. This makes it possible to increase strength by protecting the exterior cylindrical surface of the honeycomb structure 10.

The coating material is not limited in particular, and may be either equal to or different from the seal material in material. Further, the coating material may be equal to or different from the seal material in compounding ratio. The thickness of the coating material layer 16 is not limited in particular, and is preferably about 0.1 mm to about 2 mm. With thicknesses greater than or equal to about 0.1 mm, the coating material layer 16 can sufficiently protect the exterior cylindrical surface of the honeycomb structure 10, so that it is possible to increase its strength with ease. If the coating material layer 16 is less than or equal to about 2 mm in thickness, the specific surface area per unit volume as a honeycomb structure is less likely to be reduced so that it is possible to carry a catalyst component with sufficiently high dispersion easily.

It is preferable to perform calcination after joining the multiple honeycomb units 11 with the seal material (or after the coating material layer 16 is formed in the case of providing the coating material layer 16). This is because if an organic binder is included in the seal material or the coating material, the organic material can be removed by degreasing. The conditions for calcination may be determined suitably in accordance with the type and amount of the included organic binder. Preferably, the calcination is performed for approximately 2 hours at approximately 700° C. When the honeycomb structure 10 obtained by the calcination is used, there is no emission of contaminated exhaust gas due to a remaining organic binder in the honeycomb structure 10. Referring back to FIG. 1A, as an example honeycomb structure, the honeycomb structure 10 of this embodiment is formed so as to have a cylindrical shape by joining the multiple parallelepiped honeycomb units 11 each having a square cross section. The honeycomb structure 10 is formed by joining the honeycomb units 11 with the seal material layer 14, cutting the joined honeycomb units 11 into a cylindrical shape as shown in FIG. 1B, and thereafter, coating the exterior cylindrical surface 15 of the joint body of the honeycomb units 11 with the coating material layer 16. The unevenness (not graphically illustrated in FIG. 1B) of the exterior cylindrical surface 15 of the joint body of the honeycomb units 11 due to the cutting or grinding is eliminated by filling the concave parts of the exterior cylindrical surface 15 with the coating material layer 16. Optionally, the concave parts of the exterior cylindrical surface 15 may not be filled with the coating material layer 16. Alternatively, the honeycomb units 11 may be molded so as to have fan-shaped and square cross sections, and joined into a predetermined honeycomb structure shape (a cylindrical shape in FIG. 1A), thereby omitting the cutting and grinding process.

The obtained honeycomb structure 10 is not limited to a particular use. It is preferable to use the obtained honeycomb structure 10 as a catalyst carrier for converting the exhaust gas of vehicles. In the case of using the honeycomb structure 10 as a catalyst carrier for converting the exhaust gas of a diesel engine, the honeycomb structure 10 may be used with a diesel particulate filter (DPF) having a ceramic honeycomb structure of silicon carbide or the like and having the function of purifying the exhaust gas by filtering out and burning particulate matter (PM) therein. In this case, the positional relationship between the honeycomb structure 10 of this embodiment and the DPF is such that the honeycomb structure 10 of this embodiment may be provided either before or after the DPF. In the case of providing the honeycomb structure 10 before the DPF, when the honeycomb structure 10 shows a reaction accompanied by heat generation, the generated heat is conducted to the subsequent DPF, so that it is possible to promote temperature rising at the time of the regeneration of the DPF. In the case of providing the honeycomb structure 10 after the DPF, the exhaust gas passes through the through holes 12 of the honeycomb structure 10 after the PM in the exhaust gas is filtered out by the DPF. Accordingly, clogging is less likely to occur in the honeycomb structure 10. Further, a gas component generated by incomplete combustion at the time of burning the PM in the DPF can also be processed using the honeycomb structure 10 of this embodiment. The honeycomb structure 10 may be used for the purpose described above with reference to the background of the present invention. In addition, the honeycomb structure 10 may also be applied to, but is not limited in particular to, use without carrying a catalyst component (for example, as an adsorbent adsorbing a gas component or a liquid component).

Further, the obtained honeycomb structure 10 may be made a honeycomb catalyst by having a catalyst component carried thereon. The catalyst component is not limited in particular, and may be noble metal, alkali metal, alkaline earth metal, oxide, etc. The noble metal includes one or more selected from, for example, platinum, palladium, and rhodium. The alkali metal includes one or more selected from, for example, potassium and sodium. Examples of the alkaline earth metal include barium. Examples of the oxide include perovskite (such as $La_{0.75}K_{0.25}MnO_3$) and $CeO_2$. The obtained honeycomb catalyst is not limited to a particular use, and may be used as, for example, a so-called three-way catalyst or a $NO_x$ occlusion catalyst for converting automobile exhaust gas. There is no particular limitation with respect to the carrying of a catalyst component. The catalyst component may be carried either after manufacturing the honeycomb structure 10 or at the stage of raw material ceramic particles. The method of carrying a catalyst component is not limited in particular, and may be, for example, impregnation.

A description is given below of the specific cases of manufacturing honeycomb structures under various conditions as experimental examples. The present invention is not limited to these experimental examples.

EXAMPLE 1

First, 40 wt % of γ-alumina particles (2 μm in average particle size), 10 wt % of silica-alumina fibers (10 μm in average fiber diameter, 100 μm in average fiber length, and of an aspect ratio of 10), and 50 wt % of silica sol (of a solid concentration of 30 wt %) were mixed. Six parts by weight of methylcellulose as an organic binder was added, together with small amounts of a plasticizer and lubricant, to 100 parts by weight of the obtained mixture. The mixture was further mixed and kneaded, so that a mixture composition was obtained. Next, the mixture composition was subjected to extrusion molding by an extruder, so that crude molded bodies were obtained.

The extrusion molding was performed using such a mold as to form a rounded-surface shape of a radius of curvature R of 1.5 mm on each corner 18 of the honeycomb units 11.

The crude molded bodies were sufficiently dried using a microwave drier and a hot air drier, and were degreased, being heated at 400° C. for 2 hours.

Figure 3:
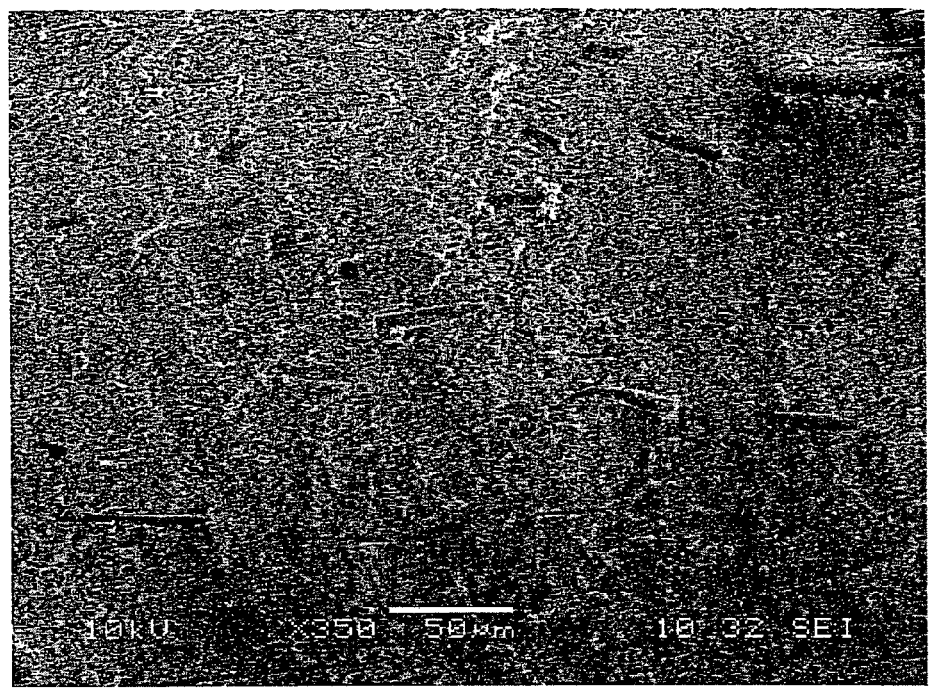
FIG. 3 is an SEM photograph of the wall surface of the honeycomb unit according to the embodiment of the present invention.

Thereafter, the molded bodies were subjected to firing, being heated at 800° C. for 2 hours. As a result, the honeycomb units 11 each having a prism-like shape (34.3 mm×34.3 mm×150 mm), a cell density of 93/cm$^2$ (600 cpsi), a wall thickness of 0.2 mm, and a quadrangular (square) cell shape were obtained. FIG. 3 shows a scanning electron microscope (SEM) photograph of the wall surface of one of the honeycomb units 11. This shows that silica-alumina fibers are oriented along the extrusion direction of the raw material paste in this honeycomb unit 11.

Figure 4A:
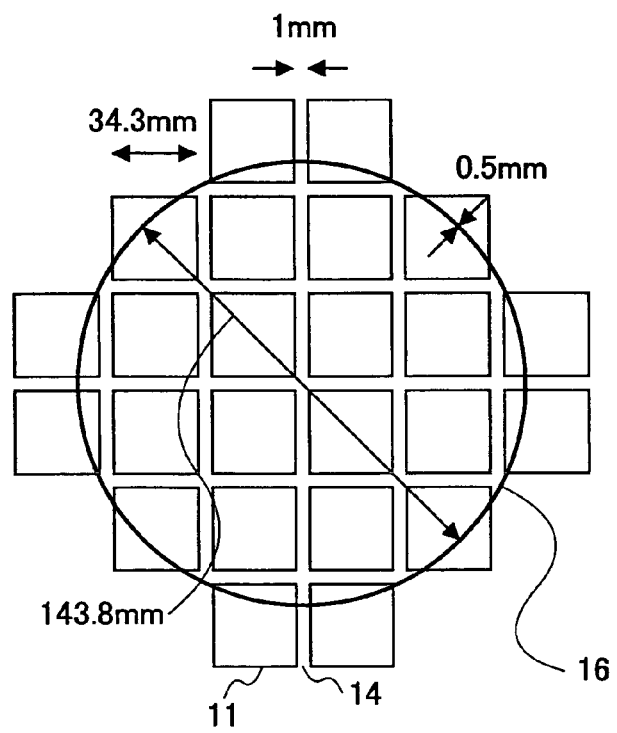
FIG. 4A is a diagram for illustrating experimental examples in which the honeycomb units were joined according to the embodiment of the present invention.

Next, 29 wt % of γ-alumina particles (2 μm in average particle size), 7 wt % of silica-alumina fibers (10 μm in average fiber diameter and 100 μm in average fiber length), 34 wt % of silica sol (of a solid concentration of 30 wt %), 5 wt % of carboxymethylcellulose, and 25 wt % of water were mixed into heat-resisting seal material paste. The honeycomb units 11 were joined using this seal material paste. FIG. 4A shows a joint body into which the honeycomb units 11 are joined, viewed from a surface thereof on which the through holes 12 are formed (hereinafter referred to as "front surface"). This joint body was formed by joining and solidifying the honeycomb units 11 with the seal material paste being applied on the exterior surfaces 13 of the honeycomb units 11 so that the seal material layer 14 was 1 mm in thickness. The joint body was thus made, and the joint body was cut cylindrically using a diamond cutter so that the front surface of the joint body was substantially symmetric about a point. Further, the above-described seal material paste was applied on the exterior cylindrical surface on which no through holes were formed so as to be 0.5 mm in thickness, thereby coating the exterior cylindrical surface. Thereafter, the obtained structure was dried at 120° C., and the seal material layer 14 and the coating material layer 16 were degreased while heating the structure at 700° C. for 2 hours. As a result, the honeycomb structure 10 having a cylindrical shape (143.8 mm in diameter and 150 mm in length) was obtained.

Table 1 shows a collection of data such as numerical values on the ceramic particle component, unit shape, unit cross-sectional area, unit area ratio (the ratio of the total cross-sectional area of the honeycomb units 11 to the cross-sectional area of the honeycomb structure 10, which applies hereinafter), and seal material layer area ratio (the ratio of the total cross-sectional area of the seal material layer 14 and the coating material layer 16 to the cross-sectional area of the honeycomb structure 10, which applies hereinafter) of this honeycomb structure 10.

TABLE 1

| SAMPLE[1] | CERAMIC PARTICLES | UNIT SHAPE cm | UNIT CROSS-SECTIONAL AREA cm$^2$ | UNIT AREA RATIO % | SEAL[2] MATERIAL LAYER AREA RATIO % |
|---|---|---|---|---|---|
| EXAMPLE 1 | ALUMINA | 3.43 SQUARE | 11.8 | 93.5 | 6.5 |
| EXAMPLE 2 | ALUMINA | 2.00 SQUARE | 4.0 | 89.7 | 10.3 |
| EXAMPLE 3 | ALUMINA | 2.24 SQUARE | 5.0 | 90.2 | 9.8 |
| EXAMPLE 4 | ALUMINA | 7.09 FAN | 39.5 | 96.9 | 3.1 |
| EXAMPLE 5 | ALUMINA | 7.10 SQUARE | 50.0 | 95.5 | 4.5 |
| EXAMPLE 6 | ALUMINA | 7.41 SQUARE | 55.0 | 95.6 | 4.4 |
| EXAMPLE 7 | ALUMINA | MONOLITHIC | 162.0 | 100.0 | 0 |
| EXAMPLE 8 | TITANIA | 3.43 SQUARE | 11.8 | 93.5 | 6.5 |
| EXAMPLE 9 | TITANIA | 2.00 SQUARE | 4.0 | 89.7 | 10.3 |
| EXAMPLE 10 | TITANIA | 2.24 SQUARE | 5.0 | 90.2 | 9.8 |
| EXAMPLE 11 | TITANIA | 7.09 FAN | 39.5 | 96.9 | 3.1 |
| EXAMPLE 12 | TITANIA | 7.10 SQUARE | 50.0 | 95.5 | 4.5 |
| EXAMPLE 13 | TITANIA | 7.41 SQUARE | 55.0 | 95.6 | 4.4 |
| EXAMPLE 14 | TITANIA | MONOLITHIC | 162.0 | 100.0 | 0 |
| EXAMPLE 15 | SILICA | 3.43 SQUARE | 11.8 | 93.5 | 6.5 |
| EXAMPLE 16 | SILICA | 2.00 SQUARE | 4.0 | 89.7 | 10.3 |
| EXAMPLE 17 | SILICA | 2.24 SQUARE | 5.0 | 90.2 | 9.8 |
| EXAMPLE 18 | SILICA | 7.09 FAN | 39.5 | 96.9 | 3.1 |
| EXAMPLE 19 | SILICA | 7.10 SQUARE | 50.0 | 95.5 | 4.5 |
| EXAMPLE 20 | SILICA | 7.41 SQUARE | 55.0 | 95.6 | 4.4 |
| EXAMPLE 21 | SILICA | MONOLITHIC | 162.0 | 100.0 | 0 |
| EXAMPLE 22 | ZIRCONIA | 3.43 SQUARE | 11.8 | 93.5 | 6.5 |
| EXAMPLE 23 | ZIRCONIA | 2.00 SQUARE | 4.0 | 89.7 | 10.3 |
| EXAMPLE 24 | ZIRCONIA | 2.24 SQUARE | 5.0 | 90.2 | 9.8 |
| EXAMPLE 25 | ZIRCONIA | 7.09 FAN | 39.5 | 96.9 | 3.1 |
| EXAMPLE 26 | ZIRCONIA | 7.10 SQUARE | 50.0 | 95.5 | 4.5 |
| EXAMPLE 27 | ZIRCONIA | 7.41 SQUARE | 55.0 | 95.6 | 4.4 |
| EXAMPLE 28 | ZIRCONIA | MONOLITHIC | 162.0 | 100.0 | 0 |
| EXAMPLE 29 | CORDIERITE + ALUMINA | MONOLITHIC | 162.0 | 100.0 | 0 |

[1]INORGANIC FIBERS = SILICA-ALUMINA FIBERS (10 μm IN DIAMETER, 100 μm IN LENGTH, ASPECT RATIO OF 10)
[2]INCLUDING AREA OF COATING MATERIAL LAYER

The contents of Examples 2 through 29 to be described below are also shown together in Table 1. In each sample shown in Table 1, the inorganic fibers are silica-alumina fibers (10 μm in average fiber diameter, 100 μm in average fiber length, and of an aspect ratio of 10), and the inorganic binder is silica sol (of a solid concentration of 30 wt %). Further, Table 2 shows a 5 collection of data such as numerical values on the inorganic fibers (type, diameter, length, and aspect ratio), unit shape, and unit cross-sectional area of each of Examples 30 through 34 to be described below.

In each example of Tables 1-3, the radius of curvature R of the corners 18 of the honeycomb units 11 was 1.5 mm.

EXAMPLES A THROUGH T

In Examples A through J, the honeycomb structures 10 were made in the same manner as in Example 1 except that extrusion molding was performed with different molds so that the rounded-surface shapes of the corners 18 of the honeycomb units 11 had predetermined radii of curvature R,

TABLE 2

| SAMPLE[1] | INORGANIC FIBERS | | | | UNIT | UNIT[2] CROSS-SECTIONAL |
|---|---|---|---|---|---|---|
| | TYPE | DIAMETER μm | LENGTH μm | ASPECT RATIO | SHAPE cm | AREA cm$^2$ |
| EXAMPLE 1 | SILICA-ALUMINA FIBERS | 10 | 100 | 10 | 3.43 SQUARE | 11.8 |
| EXAMPLE 30 | SILICA-ALUMINA FIBERS | 5 | 50 | 10 | 3.43 SQUARE | 11.8 |
| EXAMPLE 31 | SILICA-ALUMINA FIBERS | 10 | 20 | 2 | 3.43 SQUARE | 11.8 |
| EXAMPLE 32 | SILICA-ALUMINA FIBERS | 10 | 5000 | 500 | 3.43 SQUARE | 11.8 |
| EXAMPLE 33 | SILICA-ALUMINA FIBERS | 10 | 10000 | 1000 | 3.43 SQUARE | 11.8 |
| EXAMPLE 34 | SILICA-ALUMINA FIBERS | 10 | 20000 | 2000 | 3.43 SQUARE | 11.8 |

[1]CERAMIC PARTICLES = γ-ALUMINA PARTICLES
[2]UNIT AREA RATIO = 93.5% SEAL MATERIAL LAYER + COATING MATERIAL LAYER AREA RATIO = 6.5%

In each sample shown in Table 2, the ceramic particles are γ-alumina particles, the inorganic binder is silica sol (of a solid concentration of 30 wt %), the unit area ratio is 93.5%, and the seal material layer area ratio is 6.5%. Further, Table 3 shows a collection of data such as numerical values on the inorganic binder type, unit cross-sectional area, seal material layer thickness, unit area ratio, seal material layer area ratio, and firing temperature of the honeycomb units 11 of the honeycomb unit 10 of each of Examples 44-51.

thereby varying the radius of curvature R from 0 to 3.0 mm. In Examples K through T, the honeycomb structures 10 were made in the same manner as in Example 1 except that extrusion molding was performed with different molds so that the corners 18 of the honeycomb units 11 had predetermined chamfered-surface shapes, thereby changing the chamfered-surface shapes of the corners 18 of the honeycomb units 11 from 0 to 3.0 mm. In Examples J and T, the coating material layer 16 was not provided on the external cylindrical surface

TABLE 3

| SAMPLE[1] | INORGANIC BINDER TYPE | UNIT CROSS-SECTIONAL AREA cm$^2$ | SEAL MATERIAL LAYER THICKNESS mm | UNIT AREA RATIO % | SEAL[2] MATERIAL LAYER AREA RATIO % | FIRING TEMPERATURE °C. |
|---|---|---|---|---|---|---|
| EXAMPLE 44 | SILICA SOL | 11.8 | 2.0 | 89.3 | 10.7 | 800 |
| EXAMPLE 45 | SILICA SOL | 11.8 | 3.0 | 84.8 | 15.2 | 800 |
| EXAMPLE 46 | SILICA SOL | 5.0 | 2.0 | 83.5 | 16.5 | 800 |
| EXAMPLE 47 | SILICA SOL | 5.0 | 1.5 | 86.8 | 13.2 | 800 |
| EXAMPLE 48 | ALUMINA SOL | 11.8 | 1.0 | 93.5 | 6.5 | 800 |
| EXAMPLE 49 | SEPIOLITE | 11.8 | 1.0 | 93.5 | 6.5 | 800 |
| EXAMPLE 50 | ATTAPULGITE | 11.8 | 1.0 | 93.5 | 6.5 | 800 |
| EXAMPLE 51 | — | 11.8 | 1.0 | 93.5 | 6.5 | 1000 |

[1]CERAMIC PARTICLES = γ-ALUMINA PARTICLES INORGANIC FIBERS = SILICA-ALUMINA FIBERS (10 μm IN DIAMETER, 100 μm IN LENGTH, ASPECT RATIO OF 10)
[2]INCLUDING AREA OF COATING MATERIAL LAYER

In each sample shown in Table 3, the ceramic particles are γ-alumina particles (2 μm in average particle size), and the inorganic fibers are silica-alumina fibers (10 μm in average fiber diameter, 100 μm in average fiber length, and of an aspect ratio of 10).

of the honeycomb structure 10. Table 4 shows the radius of curvature R or the chamfered-surface shape of the corners 18 of the honeycomb units 11 of each example in combination with other items such as the unit cross-sectional area. In the column of unit corner shape in Table 4, R indicates a rounded-surface shape and C indicates a chamfered-surface shape.

TABLE 4

| SAMPLE | UNIT CROSS-SECTIONAL AREA cm² | UNIT AREA RATIO % | UNIT SPECIFIC SURFACE AREA m²/l | STRUCTURE SPECIFIC SURFACE AREA m²/l | UNIT CORNER SHAPE R/C | RADIUS OF CURVATURE R/CHAMFERED-SURFACE SHAPE mm | COATING LAYER THICKNESS mm | REDUCTION RATE G OF THERMAL IMPACT AND VIBRATION TESTS wt % | PRESSURE LOSS kPa |
|---|---|---|---|---|---|---|---|---|---|
| EXAMPLE A | 11.8 | 93.5 | 42000 | 39270 | R | 1.5 | 0.5 | 0 | 2.4 |
| EXAMPLE B | 4.0 | 89.7 | 42000 | 37674 | R | 1.5 | 0.5 | 0 | 2.8 |
| EXAMPLE C | 5.0 | 90.2 | 42000 | 37884 | R | 1.5 | 0.5 | 0 | 2.5 |
| EXAMPLE D | 50.0 | 95.5 | 42000 | 40110 | R | 1.5 | 0.5 | 4 | 2.3 |
| EXAMPLE E | 55.0 | 95.6 | 42000 | 40152 | R | 1.5 | 0.5 | 52 | 2.3 |
| EXAMPLE F | 11.8 | 93.5 | 42000 | 39270 | R | 0.0 | 0.5 | 20 | 2.4 |
| EXAMPLE G | 11.8 | 93.5 | 42000 | 39270 | R | 0.3 | 0.5 | 2 | 2.4 |
| EXAMPLE H | 11.8 | 93.5 | 42000 | 39270 | R | 2.5 | 0.5 | 1 | 2.4 |
| EXAMPLE I | 11.8 | 93.5 | 42000 | 39270 | R | 3.0 | 0.5 | 29 | 2.5 |
| EXAMPLE J | 11.8 | 93.5 | 42000 | 39270 | R | 1.5 | — | 8 | 2.4 |
| EXAMPLE K | 11.8 | 93.5 | 42000 | 39270 | C | 1.5 | 0.5 | 0 | 2.4 |
| EXAMPLE L | 4.0 | 89.7 | 42000 | 37674 | C | 1.5 | 0.5 | 0 | 2.8 |
| EXAMPLE M | 5.0 | 90.2 | 42000 | 37884 | C | 1.5 | 0.5 | 0 | 2.5 |
| EXAMPLE N | 50.0 | 95.5 | 42000 | 40110 | C | 1.5 | 0.5 | 5 | 2.3 |
| EXAMPLE O | 55.0 | 95.6 | 42000 | 40152 | C | 1.5 | 0.5 | 55 | 2.3 |
| EXAMPLE P | 11.8 | 93.5 | 42000 | 39270 | C | 0.0 | 0.5 | 28 | 2.4 |
| EXAMPLE Q | 11.8 | 93.5 | 42000 | 39270 | C | 0.3 | 0.5 | 2 | 2.4 |
| EXAMPLE R | 11.8 | 93.5 | 42000 | 39270 | C | 2.5 | 0.5 | 0 | 2.4 |
| EXAMPLE S | 11.8 | 93.5 | 42000 | 39270 | C | 3.0 | 0.5 | 21 | 2.5 |
| EXAMPLE T | 11.8 | 93.5 | 42000 | 39270 | C | 1.5 | — | 9 | 2.4 |

EXAMPLES 2 THROUGH 7

Figure 4B:
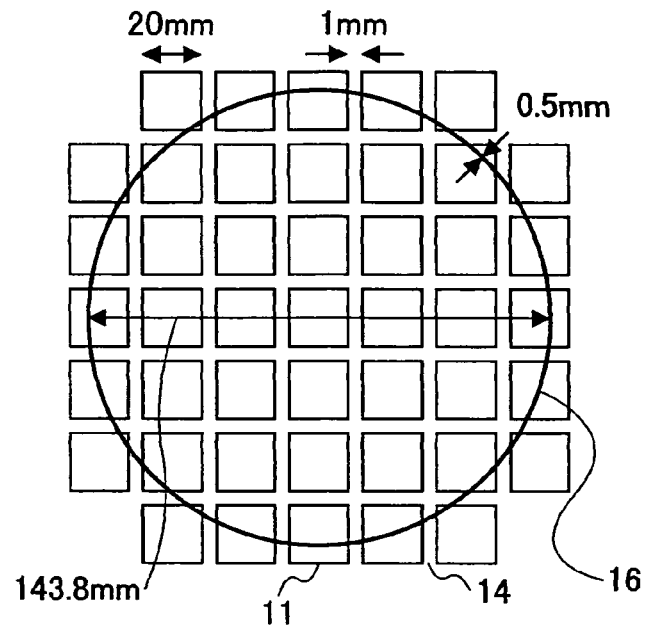
FIG. 4B is a diagram for illustrating other experimental examples in which the honeycomb units were joined according to the embodiment of the present invention.
Figure 4C:
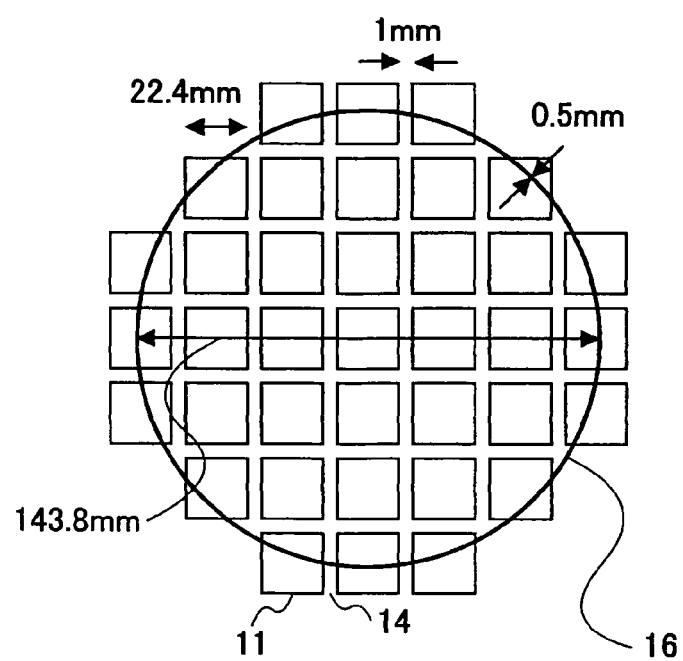
FIG. 4C is a diagram for illustrating other experimental examples in which the honeycomb units were joined according to the embodiment of the present invention.
Figure 4D:
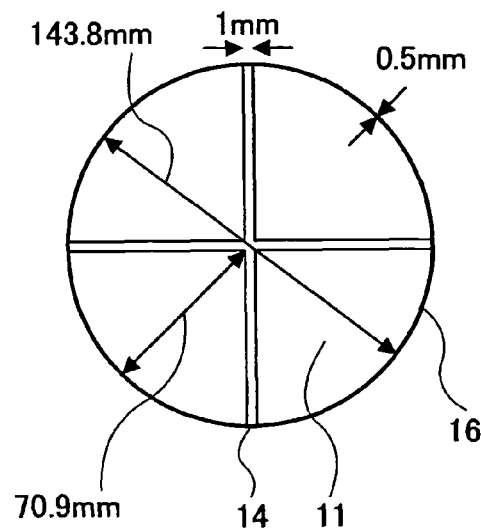
FIG. 4D is a diagram for illustrating other experimental examples in which the honeycomb units were joined according to the embodiment of the present invention.
Figure 5A:
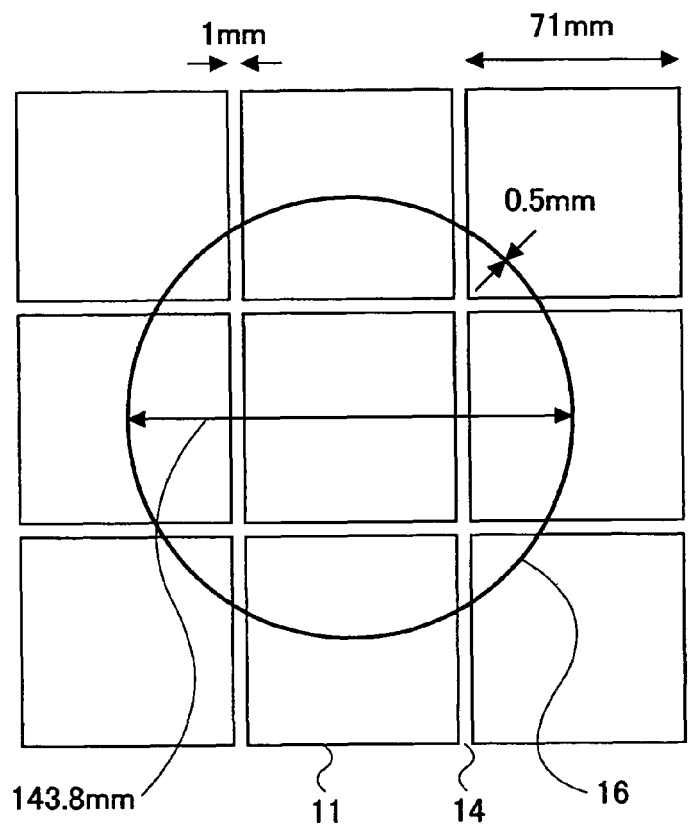
FIG. 5A is a diagram for illustrating other experimental examples in which the honeycomb units were joined according to the embodiment of the present invention.
Figure 5B:
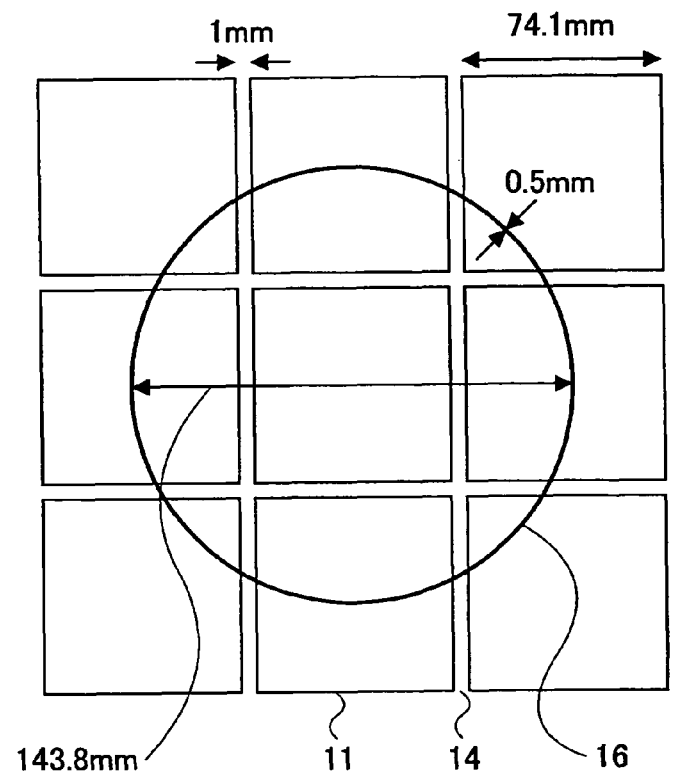
FIG. 5B is a diagram for illustrating other experimental examples in which the honeycomb units were joined according to the embodiment of the present invention.
Figure 5C:
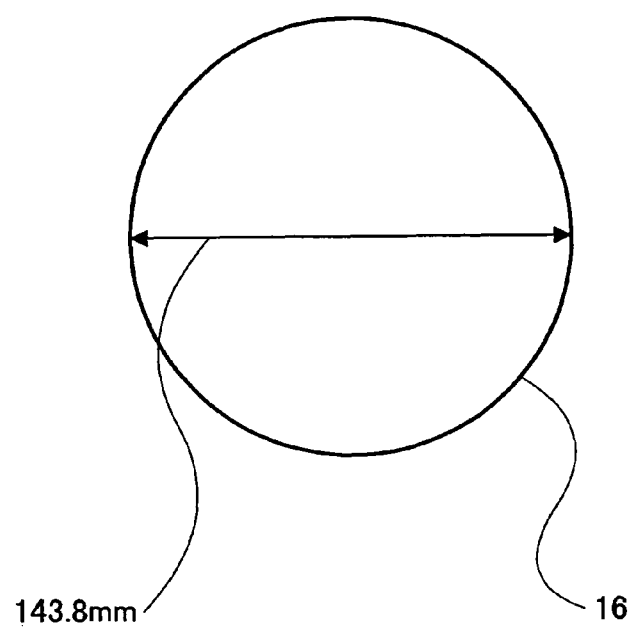
FIG. 5C is a diagram for illustrating other experimental examples of the honeycomb unit according to the embodiment of the present invention.

The honeycomb structures 10 were made in the same manner as in Example 1 except that the honeycomb units 11 were made into respective shapes shown in Table 1. The shapes of the joint bodies of Examples 2, 3, and 4 are shown in FIGS. 4B, 4C, and 4D, respectively, and the shapes of the joint bodies of Examples 5, 6, and 7 are shown in FIGS. 5A, 5B, and 5C, respectively. In Example 7, the honeycomb structure 10 was monolithically formed, and accordingly, the joining process and the cutting process were not performed.

EXAMPLES 8 THROUGH 14

The honeycomb units 11 were made in the same manner as in Example 1 except that the honeycomb units 11 were made into respective shapes shown in Table 1 using titania particles (2 μm in average particle size) instead of ceramic particles. Then, the honeycomb structures 10 were made in the same manner as in Example 1 except that the ceramic particles of the seal material layer 14 and the coating material layer 16 were replaced with titania particles (2 μm in average particle size). The joint bodies of Examples 8 through 11 are equal in shape to those of FIGS. 4A through 4D, respectively. The joint bodies of Examples 12 through 14 are equal in shape to those of FIGS. 5A through 5C, respectively. In Example 14, the honeycomb unit 10 was monolithically formed.

EXAMPLES 15 THROUGH 21

The honeycomb units 11 were made in the same manner as in Example 1 except that the honeycomb units 11 were made into respective shapes shown in Table 1 using silica particles (2 μm in average particle size) instead of ceramic particles. Then, the honeycomb structures 10 were made in the same manner as in Example 1 except that the ceramic particles of the seal material layer 14 and the coating material layer 16 were replaced with silica particles (2 μm in average particle size). The joint bodies of Examples 15 through 18 are equal in shape to those of FIGS. 4A through 4D, respectively. The joint bodies of Examples 19 through 21 are equal in shape to those of FIGS. 5A through 5C, respectively. In Example 21, the honeycomb unit 10 was monolithically formed.

EXAMPLES 22 THROUGH 28

The honeycomb units 11 were made in the same manner as in Example 1 except that the honeycomb units 11 were made into respective shapes shown in Table 1 using zirconia particles (2 μm in average particle size) instead of ceramic particles. Then, the honeycomb structures 10 were made in the same manner as in Example 1 except that the ceramic particles of the seal material layer 14 and the coating material layer 16 were replaced with zirconia particles (2 μm in average particle size). The joint bodies of Examples 22 through 25 are equal in shape to those of FIGS. 4A through 4D, respectively. The joint bodies of Examples 26 through 28 are equal in shape to those of FIGS. 5A through 5C, respectively. In Example 28, the honeycomb unit 10 was monolithically formed.

EXAMPLE 29

A commercially available cylindrical (143. 8 mm in diameter×150 mm in length) cordierite honeycomb structure in which alumina serving as a catalyst carrier layer is formed inside through holes was employed as Example 29. The cell shape was hexagonal, the cell density was 62/cm² (400 cpsi), and the wall thickness was 0.18 mm. The shape of the honeycomb structure viewed from its front surface is equal to that of FIG. 5C.

EXAMPLES 30 THROUGH 34

The honeycomb units 11 were made in the same manner as in Example 1 except that the honeycomb units 11 were designed using silica-alumina fibers of respective shapes shown in Table 2 as inorganic fibers. Then, the honeycomb structures 10 were made in the same manner as in Example 1 except that the same silica-alumina fibers as in the honeycomb units 11 were used for the seal material layer 14 and the coating material layer 16. The joint bodies of Examples 30 through 34 are equal in shape to that of FIG. 4A.

EXAMPLES 44 THROUGH 47

The honeycomb structures 10 were made in the same manner as in Example 1 except that the cross-sectional areas of the honeycomb units 11 and the thickness of the seal material layer 14 joining the honeycomb units 11 were changed as shown in Table 3. The joint bodies of Examples 44 and 45 are equal in shape to that of FIG. 4A. The joint bodies of Examples 46 and 47 are equal in shape to that of FIG. 4C.

EXAMPLE 48

The honeycomb structure 10 was made in the same manner as in Example 1 except that the honeycomb units 11 were made using alumina sol (of a solid concentration of 30 wt %) as an inorganic binder as shown in Table 3.

EXAMPLES 49 AND 50

The honeycomb structures 10 were made in the same manner as in Example 1 except that the honeycomb units 11 were made using sepiolite in Example 49 and attapulgite in Example 50 as inorganic binders. Specifically, 40 wt % of γ-alumina particles (2 μm in average particle size), 10 wt % of silica-alumina fibers (10 μm in average fiber diameter, 100 μm in average fiber length, and of an aspect ratio of 10), 15 wt % of an inorganic binder, and 35 wt % of water were mixed, and an organic binder, a plasticizer, and lubricant were added to the obtained mixture as in Example 1. Then, molding and firing were performed, so that the honeycomb units 11 were obtained. Next, the honeycomb units 11 were joined with the same seal material paste as that of Example 1. Then, as in Example 1, the obtained joint body was cut and the coating material layer 16 was formed thereon, so that the cylindrical (143. 8 mm in diameter×150 mm in length) honeycomb structure 10 was obtained.

EXAMPLE 51

The honeycomb structure 10 was made in the same manner as in Example 1 except that the honeycomb units 11 were made without putting in an inorganic binder. Specifically, 50 wt % of γ-alumina particles (2 μm in average particle size), 15 wt % of silica-alumina fibers (10 μm in average fiber diameter, 100 μm in average fiber length, and of an aspect ratio of 10), and 35 wt % of water were mixed, and as in Example 1, an organic binder, a plasticizer, and lubricant were added to the obtained mixture, and molding was performed. The obtained molded bodies were subjected to firing at 1000° C., so that the honeycomb units 11 were obtained. Next, the honeycomb units 11 were joined with the same seal material paste as that of Example 1. Then, as in Example 1, the obtained joint body was cut and the coating material layer 16 was formed thereon, so that the cylindrical (143. 8 mm in diameter×150 mm in length) honeycomb structure 10 was obtained.

[Specific Surface Area Measurement]

The specific surface areas of the honeycomb units 11 of Examples 1 through 51 and Examples A through T were measured. First, the volumes of the honeycomb units 11 and the seal material were actually measured, and the ratio of the unit material to the volume of the honeycomb structure 10 (=A [vol %]) was calculated. Next, the BET specific surface area per unit weight of the honeycomb units 11 (=B [m²/g]) was measured. The BET specific surface area was measured by the single-point method based on JIS-R-1626 (1996) set by Japanese Industrial Standards using a BET measuring apparatus (Micromeritics FlowSorb II-2300 manufactured by Shimadzu Corporation). In the measurement, a cylindrically cut-out small piece (15 mm in diameter×15 mm in height) was employed as a sample. The apparent density of the honeycomb units 11 (=C [g/L]) was calculated from the weight and the volume of the outer shape of the honeycomb units 11, and the specific surface area of the honeycomb structure 10 (=S [m²/L]) was given by the following Eq. (1). Here, the specific surface area of the honeycomb structure 10 refers to the specific surface area per apparent volume of the honeycomb structure 10.

$$S(m^2/L) = (A/100) \times B \times C. \tag{1}$$

The contents of JIS-R-1626 (1996) are incorporated herein by reference in their entirety.

[Repeated Thermal Shock and Vibration Tests]

Figure 6A:
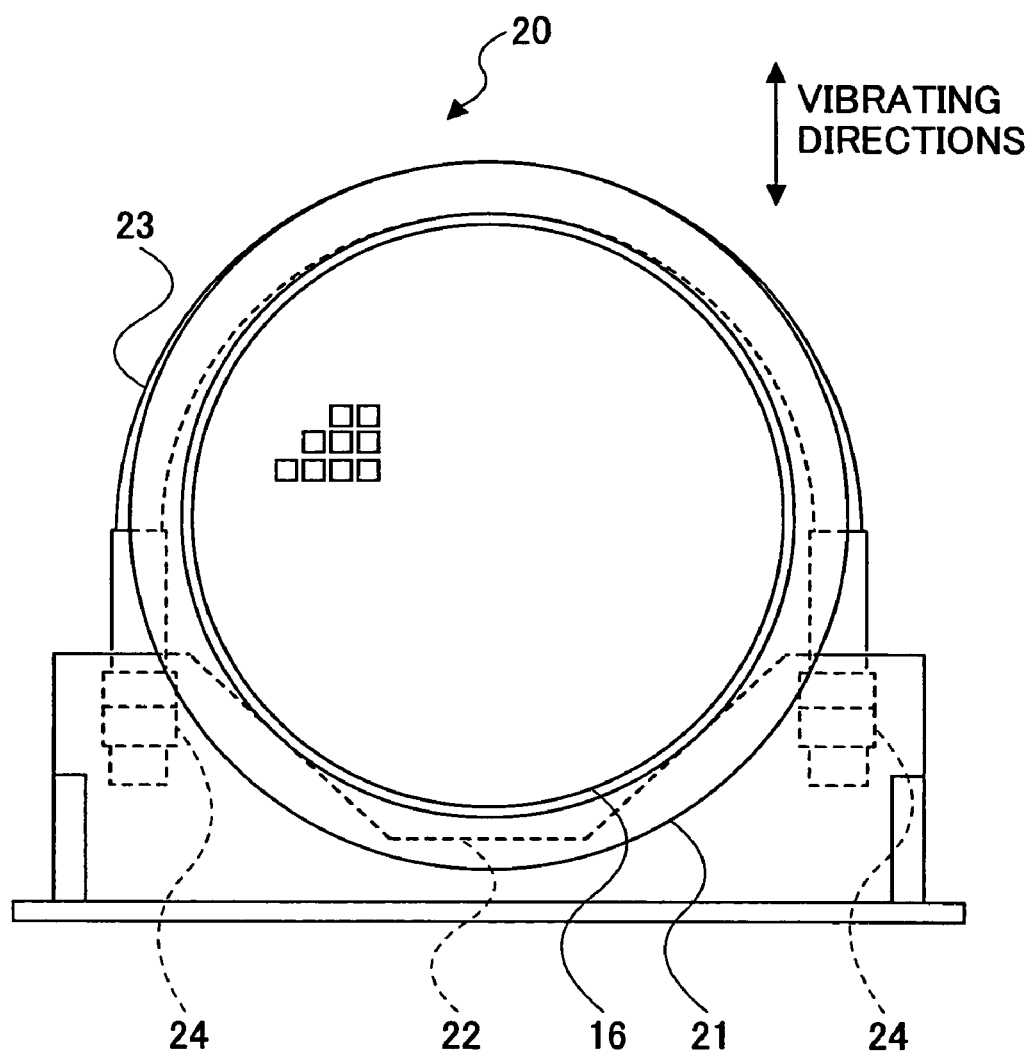
FIG. 6A is a front view of a vibration apparatus according to the embodiment of the present invention.
Figure 6B:
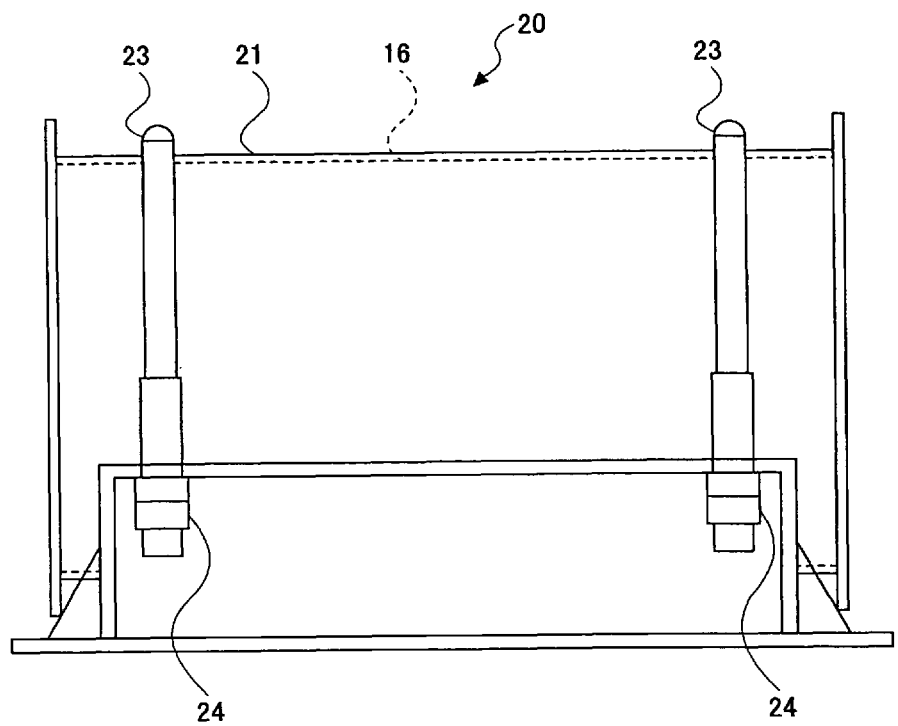
FIG. 6B is a side view of the vibration apparatus according to the embodiment of the present invention.

The honeycomb structures 10 of Examples 1 through 51 and Examples A through T were subjected to repeated thermal shock and vibration tests. In the thermal shock test, each honeycomb structure 10 in a metal casing 21 (FIGS. 6A and 6B) with an alumina mat (MAFTEC, manufactured by Mitsubishi Chemical Functional Products, Inc., 46.5 cm×15 cm, 6 mm in thickness), which is a heat insulator formed of alumina fibers, being around the exterior cylindrical surface of the honeycomb structure 10, was put in a furnace set at 600° C. After being heated for 10 minutes, the honeycomb structure 10 in the metal casing 21 was extracted from the furnace and cooled rapidly to room temperature. Next, the vibration test was conducted on the honeycomb structure 10 in the metal casing 21. FIG. 6A is a front view of a vibration apparatus 20 used for the vibration test. FIG. 6B is a side view of the vibration apparatus 20. The metal casing 21 containing the honeycomb structure 10 was placed on a seat 22, and the metal casing 21 was fixed by fastening substantially U-shaped fixtures 23 with screws 24. As a result, the metal casing 21 was capable of vibrating with the seat 22 and the fixtures 23 as a unit. With respect to Examples 1 through 51, the vibration test was conducted under the conditions of a frequency of 160 Hz, an acceleration of 30 G, an amplitude of 0.58 mm, a retention time of 10 hours, room temperature, and the vibrating directions along the Z-axis (upward and downward). On the other hand, with respect to Examples A through T, the retention time was 20 hours. These thermal shock test and vibration test were repeated alternately ten times each, and the weight of the honeycomb structure 10 before the tests (=T0) and the weight of the honeycomb structure after the tests (=Ti) were measured, so that the rate of weight reduction (=G) was determined using the following Eq. (2).

$$G(\text{wt }\%) = 100 \times (T0 - Ti)/T0. \tag{2}$$

[Pressure Loss Measurement]

Figure 7:
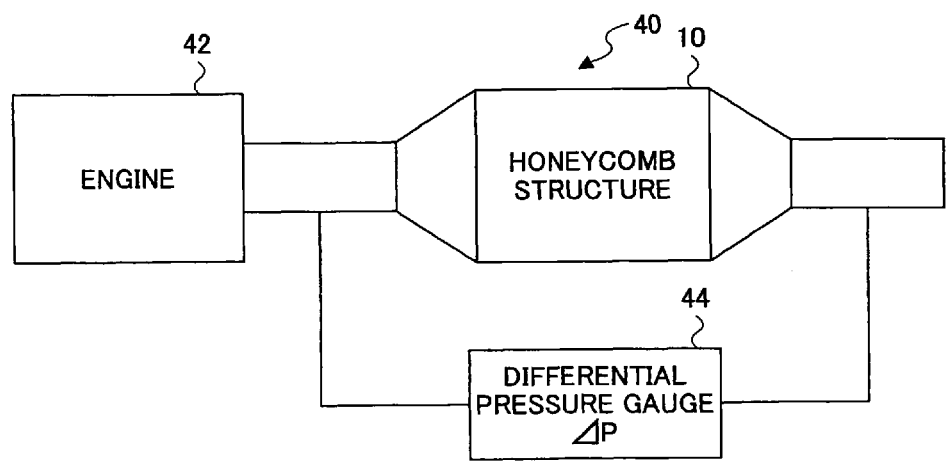
FIG. 7 is a diagram for illustrating a pressure loss measuring apparatus according to the embodiment of the present invention.

The pressure loss of each of the honeycomb structures 10 of Examples 1 through 51 and Examples A through T was measured. FIG. 7 is a schematic diagram showing a pressure loss measuring apparatus 40. The measurement was performed as follows. The honeycomb structure 10 having an alumina mat wrapped therearound in a metal casing was placed in the exhaust pipe of a 2L common rail diesel engine 42, and a differential pressure gauge 44 was attached across the honeycomb structure 10. The measurement conditions were an engine speed of 1500 rpm and a torque of 50 Nm, and the differential pressure at 5 minutes after the start of operation was measured.

[Experimental Results]

Figure 8:
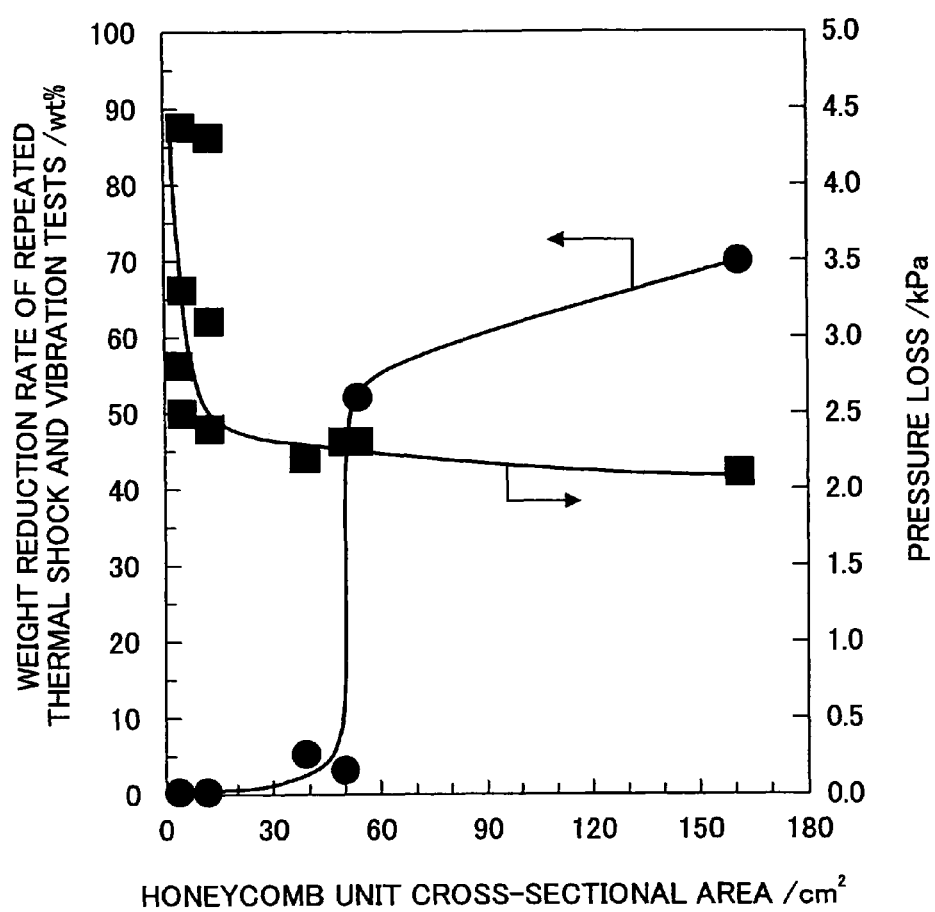
FIG. 8 is a graph showing the relationship between the cross-sectional area of the honeycomb unit and each of weight reduction rate and pressure loss according to the embodiment of the present invention.
Figure 9:
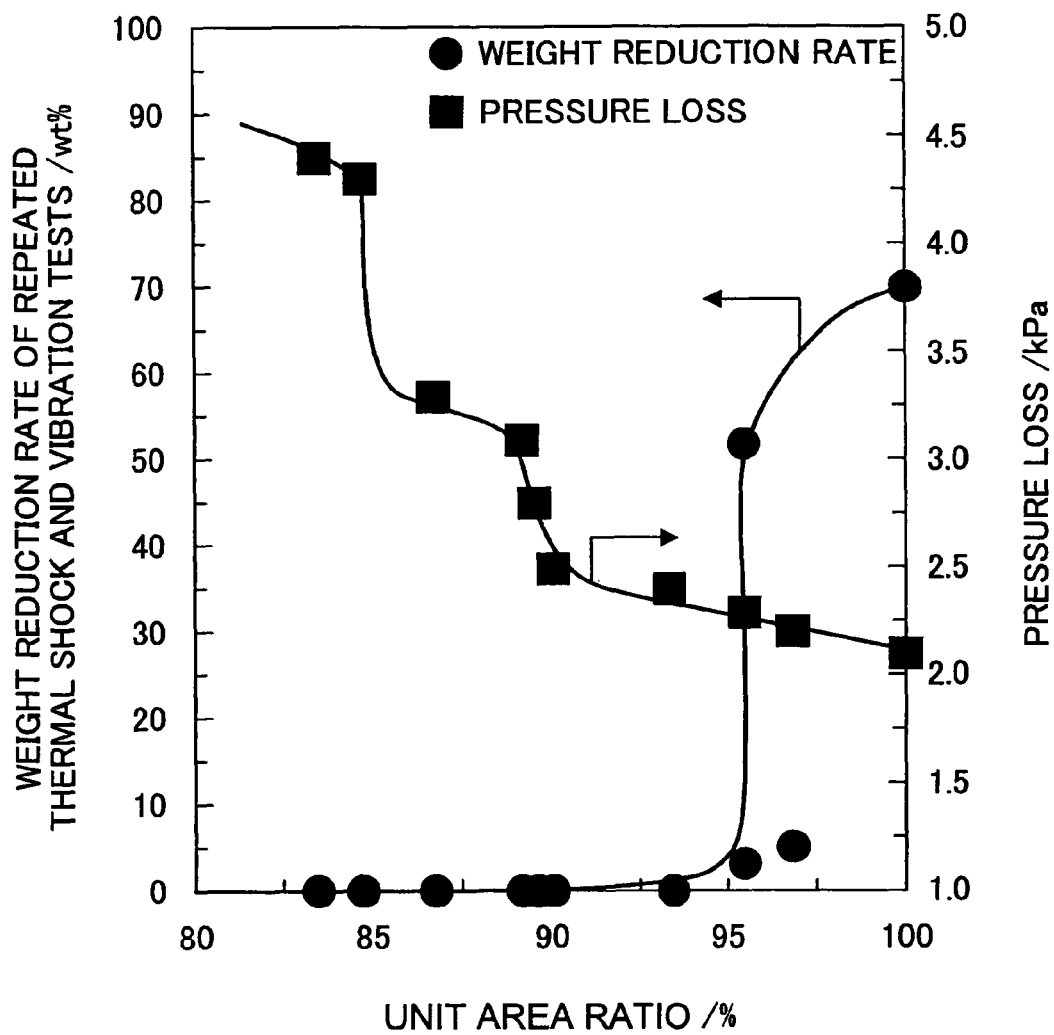
FIG. 9 is a graph showing the relationship between unit area ratio and each of weight reduction rate and pressure loss according to the embodiment of the present invention.

Table 5 shows a collection of data such as numerical values on the ceramic particle component(s), unit cross-sectional area, unit area ratio, the specific surface area of the honeycomb unit 11, the specific surface area S of the honeycomb structure 10, the weight reduction rate G of the repeated thermal shock and vibration tests, and pressure loss of each of Examples 1 through 29 and 44 through 47. FIG. 8 is a graph showing the cross-sectional area of the honeycomb unit 11 plotted as the horizontal axis, and the weight reduction rate G of the repeated thermal shock and vibration tests and the pressure loss plotted as the vertical axes. FIG. 9 is a graph showing the unit area ratio plotted as the horizontal axis, and the weight reduction rate G of the repeated thermal shock and vibration tests and the pressure loss plotted as the vertical axes.

FIG. 9, with ceramic particles, inorganic fibers, and an inorganic binder being employed as principal components, the cross-sectional area of the honeycomb unit 11 being less than or equal to 50 cm$^2$, and the unit area ratio being greater than or equal to 85%, the honeycomb structure 10 has a large specific surface area per unit volume, sufficient strength against thermal shock and vibration, and reduced pressure loss. In particular, when the unit area ratio is greater than or equal to 90%, the pressure loss decreases conspicuously.

Table 4 shows a collection of the results of the weight reduction rate G of the repeated thermal shock and vibration tests and the pressure loss of Examples A through J, in which the radius of curvature R of the corners 18 of the honeycomb units 11 was varied, and Examples K through T, in which the chamfered-surface shapes of the corners 18 of the honeycomb units 11 were changed. These results show that the honeycomb structure 10 has excellent strength when the radius of curvature R of the corners 18 of the honeycomb units 11 falls within the range of 0.3-2.5 mm. Further, these results show

TABLE 5

| SAMPLE[x] | CERAMIC PARTICLES | UNIT CROSS-SECTIONAL AREA cm$^2$ | UNIT AREA RATIO % | UNIT SPECIFIC SURFACE AREA m$^2$/L | STRUCTURE SPECIFIC SURFACE AREA S m$^2$/L | REDUCTION RATE G OF THERMAL SHOCK AND VIBRATION TESTS wt % | PRESSURE LOSS kPa |
|---|---|---|---|---|---|---|---|
| EXAMPLE 1 | ALUMINA | 11.8 | 93.5 | 42000 | 39270 | 0 | 2.4 |
| EXAMPLE 2 | ALUMINA | 4.0 | 89.7 | 42000 | 37674 | 0 | 2.8 |
| EXAMPLE 3 | ALUMINA | 5.0 | 90.2 | 42000 | 37884 | 0 | 2.5 |
| EXAMPLE 4 | ALUMINA | 39.5 | 96.9 | 42000 | 40698 | 5 | 2.2 |
| EXAMPLE 5 | ALUMINA | 50.0 | 95.5 | 42000 | 40110 | 3 | 2.3 |
| EXAMPLE 6 | ALUMINA | 55.0 | 95.6 | 42000 | 40152 | 52 | 2.3 |
| EXAMPLE 7 | ALUMINA | 162.0 | 100.0 | 42000 | 42000 | 70 | 2.1 |
| EXAMPLE 8 | TITANIA | 11.8 | 93.5 | 38000 | 35530 | 0 | 2.4 |
| EXAMPLE 9 | TITANIA | 4.0 | 89.7 | 38000 | 34086 | 0 | 2.8 |
| EXAMPLE 10 | TITANIA | 5.0 | 90.2 | 38000 | 34276 | 0 | 2.5 |
| EXAMPLE 11 | TITANIA | 39.5 | 96.9 | 38000 | 36822 | 7 | 2.2 |
| EXAMPLE 12 | TITANIA | 50.0 | 95.5 | 38000 | 36290 | 5 | 2.3 |
| EXAMPLE 13 | TITANIA | 55.0 | 95.6 | 38000 | 36328 | 63 | 2.3 |
| EXAMPLE 14 | TITANIA | 162.0 | 100.0 | 38000 | 38000 | 90 | 2.1 |
| EXAMPLE 15 | SILICA | 11.8 | 93.5 | 41000 | 38335 | 0 | 2.4 |
| EXAMPLE 16 | SILICA | 4.0 | 89.7 | 41000 | 36777 | 0 | 2.8 |
| EXAMPLE 17 | SILICA | 5.0 | 90.2 | 41000 | 36982 | 0 | 2.5 |
| EXAMPLE 18 | SILICA | 39.5 | 96.9 | 41000 | 39729 | 4 | 2.2 |
| EXAMPLE 19 | SILICA | 50.0 | 95.5 | 41000 | 39155 | 3 | 2.3 |
| EXAMPLE 20 | SILICA | 55.0 | 95.6 | 41000 | 39196 | 42 | 2.3 |
| EXAMPLE 21 | SILICA | 162.0 | 100.0 | 41000 | 41000 | 65 | 2.1 |
| EXAMPLE 22 | ZIRCONIA | 11.8 | 93.5 | 41500 | 38803 | 0 | 2.4 |
| EXAMPLE 23 | ZIRCONIA | 4.0 | 89.7 | 41500 | 37226 | 0 | 2.8 |
| EXAMPLE 24 | ZIRCONIA | 5.0 | 90.2 | 41500 | 37433 | 0 | 2.5 |
| EXAMPLE 25 | ZIRCONIA | 39.5 | 96.9 | 41500 | 40214 | 5 | 2.2 |
| EXAMPLE 26 | ZIRCONIA | 50.0 | 95.5 | 41500 | 39633 | 3 | 2.3 |
| EXAMPLE 27 | ZIRCONIA | 55.0 | 95.6 | 41500 | 39674 | 57 | 2.3 |
| EXAMPLE 28 | ZIRCONIA | 162.0 | 100.0 | 41500 | 41500 | 83 | 2.1 |
| EXAMPLE 29 | CORDIERITE + ALUMINA | 162.0 | 100.0 | 25000 | 25000 | 0 | 2.9 |
| EXAMPLE 44 | ALUMINA | 11.8 | 89.3 | 42000 | 37506 | 0 | 3.1 |
| EXAMPLE 45 | ALUMINA | 11.8 | 84.8 | 42000 | 35616 | 0 | 4.3 |
| EXAMPLE 46 | ALUMINA | 5.0 | 83.5 | 42000 | 35070 | 0 | 4.4 |
| EXAMPLE 47 | ALUMINA | 5.0 | 86.8 | 42000 | 36456 | 0 | 3.3 |

[x]INORGANIC FIBERS = SILICA-ALUMINA FIBERS (10 μm IN DIAMETER, 100 μm IN LENGTH, ASPECT RATIO OF 10)

The measurement results of Examples 1 through 29 and 44 through 47 shown in Table 5 and FIG. 8 clearly show that with ceramic particles, inorganic fibers, and an inorganic binder being employed as principal components and the cross-sectional area of the honeycomb unit 11 being within 5-50 cm$^2$, the honeycomb structure 10 has a large specific surface area per unit volume and sufficient strength against thermal shock and vibration. Further, it has also been found that as shown in that the honeycomb structure 10 has excellent strength when the chamfered-surface shapes are 0.3-2.5 mm. It is easily inferred that the same effect can also be produced when the corners 18 of the single honeycomb unit 11 include both rounded-surface and chamfered-surface shapes within the above-described ranges.

Figure 10:
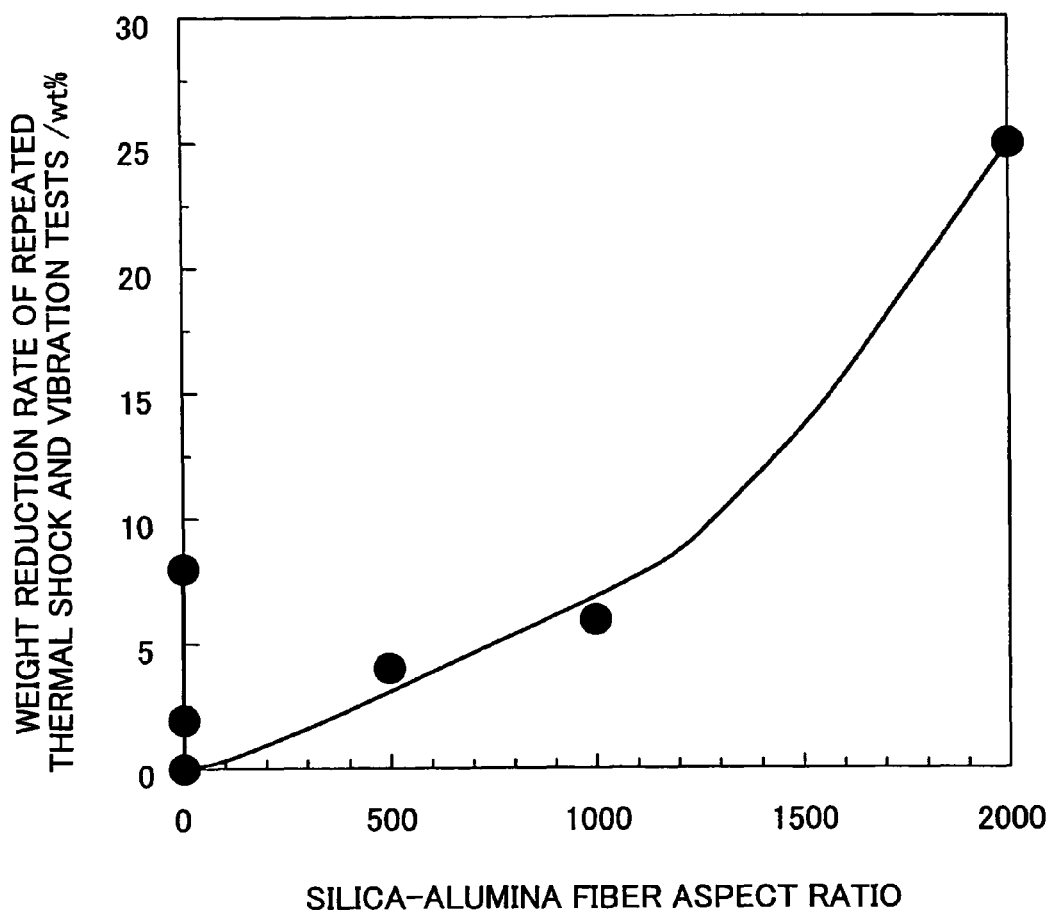
FIG. 10 is a graph showing the relationship between the aspect ratio of silica-alumina fibers and weight reduction rate according to the embodiment of the present invention.

Next, Table 6 shows a collection of numerical data on the diameter, length, and aspect ratio of the silica-alumina fibers;

the specific surface area of the honeycomb unit 11; the specific surface area S of the honeycomb structure 10; the weight reduction rate G of the repeated thermal shock and vibration tests; and the pressure loss of Examples 1 and 30 through 34 in which the aspect ratio of inorganic fibers was varied. FIG. 10 is a graph showing the aspect ratio of the silica-alumina fibers plotted as the horizontal axis, and the weight reduction rate G of the repeated thermal shock and vibration tests plotted as the vertical axis with respect to Examples 1 and 30 through 34.

a great specific surface area per unit volume and sufficient strength against thermal shock and vibration.

[Honeycomb Catalyst]

Each of the honeycomb structures 10 of Examples 1 through 43 was impregnated with a platinum nitrate solution, and was caused to carry a catalyst component with the weight of platinum per unit volume of the honeycomb structure 10 being controlled to 2g/L. Then, the honeycomb structure 10 was heated at 600° C. for 1 hour, so that a honeycomb catalyst was obtained.

TABLE 6

| SAMPLE[X] | SILICA-ALUMINA FIBERS | | | UNIT SPECIFIC SURFACE AREA $m^2/L$ | STRUCTURE SPECIFIC SURFACE AREA S $m^2/L$ | REDUCTION RATE G OF THERMAL SHOCK AND VIBRATION TESTS wt % | PRESSURE LOSS kPa |
|---|---|---|---|---|---|---|---|
| | DIAMETER μm | LENGTH μm | ASPECT RATIO | | | | |
| EXAMPLE 1 | 10 | 100 | 10 | 42000 | 39270 | 0 | 2.4 |
| EXAMPLE 30 | 5 | 50 | 10 | 42000 | 39270 | 2 | 2.4 |
| EXAMPLE 31 | 10 | 20 | 2 | 42000 | 39270 | 8 | 2.4 |
| EXAMPLE 32 | 10 | 5000 | 500 | 42000 | 39270 | 4 | 2.4 |
| EXAMPLE 33 | 10 | 10000 | 1000 | 42000 | 39270 | 6 | 2.4 |
| EXAMPLE 34 | 10 | 20000 | 2000 | 42000 | 39270 | 25 | 2.4 |

[X]CERAMIC PARTICLES = γ-ALUMINA PARTICLES

These results show that sufficient strength against thermal shock and vibration can be obtained when the aspect ratio of inorganic fibers falls within the range of 2-1000.

Next, Table 7 shows a collection of data such as numerical values on the inorganic binder type, the firing temperature of the honeycomb unit 11, unit area ratio, the specific surface area of the honeycomb unit 11, the specific surface area S of the honeycomb structure 10, the weight reduction rate G of the repeated thermal shock and vibration tests, and pressure loss of each of Examples 48 through 50, in which the honeycomb units 11 were made with different types of inorganic binders, and Example 51, in which the honeycomb units 11 were made without putting in an inorganic binder.

According to one embodiment of the present invention, in a honeycomb structure having multiple honeycomb units united through a seal material layer, the honeycomb units each having multiple through holes arranged side by side in a longitudinal direction and separated from each other by the wall surfaces of the through holes, the honeycomb units include at least ceramic particles and inorganic fibers and/or whiskers, at least one of the honeycomb units has a cross section perpendicular to a longitudinal direction thereof, the cross section having an area greater than or equal to about 5 cm² and less than or equal to about 50 cm², and each corner of each honeycomb unit has a shape of one of a substantially rounded surface and a substantially chamfered surface.

TABLE 7

| SAMPLE[X] | INORGANIC BINDER TYPE | UNIT AREA RATIO % | FIRING TEMPERATURE ° C. | UNIT SPECIFIC SURFACE AREA $m^2/L$ | STRUCTURE SPECIFIC SURFACE AREA S $m^2/L$ | REDUCTION RATE G OF THERMAL SHOCK AND VIBRATION TESTS wt % | PRESSURE LOSS kPa |
|---|---|---|---|---|---|---|---|
| EXAMPLE 48 | ALUMINA SOL | 93.5 | 800 | 42000 | 39270 | 0 | 2.4 |
| EXAMPLE 49 | SEPIOLITE | 93.5 | 800 | 42000 | 39270 | 0 | 2.4 |
| EXAMPLE 50 | ATTAPULGITE | 93.5 | 800 | 42000 | 39270 | 0 | 2.4 |
| EXAMPLE 51 | — | 93.5 | 1000 | 42000 | 37400 | 20 | 2.4 |

[X]CERAMIC PARTICLES = γ-ALUMINA PARTICLES INORGANIC FIBERS = SILICA-ALUMINA FIBERS (10 μm IN DIAMETER, 100 μm IN LENGTH, ASPECT RATIO OF 10) UNIT SHAPE = 3.43 cm square These results show that when no inorganic binder is put in, sufficient strength can be obtained by firing at relatively high temperatures. Further, these results show that sufficient strength can also be obtained by firing at relatively low temperatures when an inorganic binder is put in. These results also show that even when the inorganic binder is alumina sol or a clay-based binder, the honeycomb structure 10 can have Thus, a honeycomb structure capable of achieving high dispersion of a catalyst component and increasing strength against thermal shock and vibration can be provided.

Additionally, in the honeycomb structure, the rounded surface of each corner of each honeycomb unit may have a radius of curvature of about 0.3 mm to about 2.5 mm. This makes it possible to ease stress concentration on the edge parts of the honeycomb structure, thus increasing its strength.

Additionally, in the honeycomb structure, the shape of the chamfered surface of each corner of each honeycomb unit may be about 0.3 mm to about 2.5 mm in size. This makes it possible to ease stress concentration on the edge parts of the honeycomb structure, thus increasing its strength.

Additionally, in the honeycomb structure, the ratio of the total of the areas of the cross sections of the honeycomb units perpendicular to the longitudinal direction thereof to the area of a cross section of the honeycomb structure perpendicular to a longitudinal direction thereof is greater than or equal to about 85%. This makes it possible to cause a relative increase in the surface area capable of carrying a catalyst, and a relative reduction in pressure loss.

Additionally, the honeycomb structure may include a coating material layer on the exterior surface thereof. This makes it possible to increase the strength of the honeycomb structure by protecting its exterior surface.

Additionally, in the honeycomb structure, the ceramic particles may include at least one selected from alumina, silica, zirconia, titania, ceria, mullite, and zeolite. This makes it possible to increase the specific surface area of the honeycomb units.

Additionally, in the honeycomb structure the inorganic fibers and/or the whiskers may include at least one selected from alumina, silica, silicon carbide, silica alumina, glass, potassium titanate, and aluminum borate. This makes it possible to increase the strength of the honeycomb units.

Additionally, in the honeycomb structure, the honeycomb units may be manufactured using a mixture including the ceramic particles, the inorganic fibers and/or the whiskers, and an inorganic binder; and the inorganic binder may include at least one selected from alumina sol, silica sol, titania sol, water glass, sepiolite, and attapulgite. This makes it possible to obtain sufficient strength even if the honeycomb units are subjected to firing at low temperatures.

Additionally, a catalyst component may be carried on the honeycomb structure. As a result, a honeycomb catalyst having a catalyst component highly dispersed can be obtained.

Additionally, in the honeycomb structure, the catalyst component may include at least one component selected from noble metal, alkali metal, alkaline earth metal, and oxide. This makes it possible to increase conversion performance.

Additionally, the honeycomb structure may be used for converting the exhaust gas of a vehicle.

The present invention may be applied to a catalyst carrier for converting (purifying) the exhaust gas of vehicles and an adsorbent adsorbing a gas component or a liquid component.

The present invention is not limited to the specifically disclosed embodiment, and variations and modifications may be made without departing from the scope of the present invention.

The present application is based on PCT International Application No. PCT/JP2005/011657, filed on Jun. 24, 2005, the entire contents of which are hereby incorporated by reference.

What is claimed is:

1. A honeycomb structure having a plurality of honeycomb units united through a seal material layer, the honeycomb units each having a plurality of through holes arranged side-by side in a longitudinal direction and separated from each other by wall surfaces of the through holes, all of the through holes being open on an end face of the honeycomb unit, wherein:
the honeycomb units comprise at least: ceramic particles and at least one of inorganic fibers and whiskers, thereby increasing a specific surface area of the honeycomb units;
at least one of the honeycomb units has a cross section perpendicular to a longitudinal direction thereof, the cross section having an area greater than or equal to about 5 $cm^2$ and less than or equal to about 50 $cm^2$;
a ratio of a total cross sectional area of all the honeycomb units, perpendicular to the longitudinal direction thereof, to an area of a cross section of the honeycomb structure perpendicular to a longitudinal direction thereof, is greater than or equal to about 85%;
the ceramic particles comprise at least one selected from the group consisting of alumina, silica, zirconia, titania, ceria, mullite, and zeolite;
the honeycomb units are formed by firing a material including the ceramic particles and that least one of the inorganic fibers and the whiskers at about 600° C. to about 1200° C.; and
each of corners of each honeycomb unit has a shape of one of a substantially rounded surface and a substantially chamfered surface.

2. The honeycomb structure as claimed in claim 1, wherein the rounded surface of each corner of each honeycomb unit has a radius of curvature of about 0.3 mm to about 2.5 mm.

3. The honeycomb structure as claimed in claim 1, wherein the shape of the chamfered surface of each corner of each honeycomb unit is about 0.3 mm to about 2.5 mm in size.

4. The honeycomb structure as claimed in claim 1, further comprising: a coating material layer on an exterior surface of the honeycomb structure.

5. The honeycomb structure as claimed in claim 1, wherein the at least one of the inorganic fibers and the whiskers comprise at least one selected from the group consisting of alumina, silica, silicon carbide, silica alumina, glass, potassium titanate, and aluminum borate.

6. The honeycomb structure as claimed in claim 1, wherein:
the honeycomb units are manufactured using a mixture including the ceramic particles, the at least one of the inorganic fibers and the whiskers, and an inorganic binder; and
the inorganic binder comprises at least one selected from the group consisting of alumina sol, silica sol, titania sol, water glass, sepiolite, and attapulgite.

7. The honeycomb structure as claimed in claim 1, wherein a catalyst component is carried on the honeycomb structure.

8. The honeycomb structure as claimed in claim 7, wherein the catalyst component comprises at least one component selected from the group of noble metal, alkali metal, alkaline earth metal, and oxide.

9. The honeycomb structure as claimed in claim 1, wherein the honeycomb structure is used for conversion of exhaust gas of a vehicle.

10. The honeycomb structure as claimed in claim 1, wherein a number of the through holes per unit cross-sectional area is about 15.5/$cm^2$ to about 186/$cm^2$.

11. The honeycomb structure as claimed in claim 1, wherein the seal material layer is about 0.5 mm to about 2 mm in thickness.

12. The honeycomb structure as claimed in claim 1, wherein a wall between the through holes is about 0.05 mm to about 0.35 mm in thickness.

13. The honeycomb structure as claimed in claim 1, wherein an amount of the at least one of the inorganic fibers and the whiskers included in the honeycomb structure is about 3 wt% to about 70 wt%.

14. The honeycomb structure as claimed in claim 1, wherein the inorganic fibers are silica-alumina fibers.

* * * * *